US012663382B2

(12) United States Patent
Longyear et al.

(10) Patent No.: US 12,663,382 B2
(45) Date of Patent: Jun. 23, 2026

(54) ESTIMATING BIOFILM BIOMASS ON OBJECTS IN AN AQUATIC ENVIRONMENT

(71) Applicant: Akzo Nobel Coatings International B.V., Amsterdam (NL)

(72) Inventors: Jennifer Elise Longyear, Amsterdam (NL); Paul Stoodley, Southampton (GB)

(73) Assignee: Akzo Nobel Coatings International B.V., Amsterdam (NL)

( * ) Notice: Subject to any disclaimer, the term of this patent is extended or adjusted under 35 U.S.C. 154(b) by 568 days.

(21) Appl. No.: 18/027,189

(22) PCT Filed: Sep. 29, 2021

(86) PCT No.: PCT/EP2021/076725
§ 371 (c)(1),
(2) Date: Mar. 20, 2023

(87) PCT Pub. No.: WO2022/069505
PCT Pub. Date: Apr. 7, 2022

(65) Prior Publication Data
US 2023/0358689 A1 Nov. 9, 2023

Related U.S. Application Data

(60) Provisional application No. 63/086,852, filed on Oct. 2, 2020.

(30) Foreign Application Priority Data

Dec. 1, 2020 (EP) ..................................... 20210887

(51) Int. Cl.
*G01N 21/31* (2006.01)
*G01N 21/94* (2006.01)

(52) U.S. Cl.
CPC ............. *G01N 21/94* (2013.01); *G01N 21/31* (2013.01); *G01N 2021/945* (2013.01)

(58) Field of Classification Search
None
See application file for complete search history.

(56) References Cited

U.S. PATENT DOCUMENTS

2005/0151971 A1 7/2005 Tabacco et al.
2007/0236692 A1 10/2007 Schebesta et al.
(Continued)

FOREIGN PATENT DOCUMENTS

JP       H09248198      9/1997
JP       2019513232     5/2019
KR       20140107981 A  9/2014

OTHER PUBLICATIONS

Battistuzzi M et al . A New Remote Sensing-Based System for the Monitoring and Analysis of Growth and Gas Exchange Rates of Photosynthetic Microorganisms Under Simulated Non-Terrestrial Conditions. Front Plant Sci. Mar. 4, 2020;11:182 (Year: 2020).*
(Continued)

*Primary Examiner* — Beniyam Menberu
(74) *Attorney, Agent, or Firm* — Pauly, DeVries Smith & Deffner LLC

(57) ABSTRACT

System and method for estimating aquatic environment-originating biofilm biomass on a coating of an object. The method includes obtaining one or more digital images of a fouled portion of the coating on the object and determining from each of the one or more images a respective reflectance value for the portion of the coating. The method includes determining on the basis of the one or more reflectance values a value of a spectral index representative of biomass and calculating a biomass pigment surface area density on the basis of the spectral index, SI, and one or more calibration values determined for a reference coating. The method
(Continued)

includes compensating the calculated biomass pigment surface area density for the reflectance of the coating of the object by applying a compensation associated with the difference of the reflectance of the coating of the object relative to the reference coating.

19 Claims, 15 Drawing Sheets

(56) References Cited

U.S. PATENT DOCUMENTS

| | | |
|---|---|---|
| 2014/0038065 A1 | 2/2014 | Ramasamy |
| 2016/0069743 A1* | 3/2016 | McQuilkin ............ A22B 5/007 |
| | | 356/416 |
| 2017/0053391 A1 | 2/2017 | Bonheyo et al. |

OTHER PUBLICATIONS

"International Preliminary Report on Patentability," for PCT Application No. PCT/EP2021/076725 mailed Mar. 28, 2023 (6 pages).

"Office Action," for Japanese Patent Application No. 2023-518913 mailed Nov. 21, 2023 (4 pages), English translation only.

English Transalation of KR20140107981A.

J. Serôdio el al., Effects of Chlorophyll Fluorescence on the Estimation of Microphytobenthos . . . , Remote Sensing of Environment, Elsevier, XX, vol. 113, No. 8, pp. 1760-1768.

Jeremy C. Thomason, Field Trials with Biofilms, Biofouling Methods, First Edition, 2014, pp. 190-202.

European Search Report of Corresponding Application No. EP 20210887.4 dated May 19, 2021.

International Search Report and en Opinion of Corresponding Application No. PCT/EP2021/076725, mailed Mar. 23, 2022.

* cited by examiner (a) white (b) red (c) grey wavelength [nm]

(d) blue (e) black (f) yellow wavelength [nm]

(a) white (b) red

Coating-normalised biofilm fouling reflectance (c) grey wavelength [nm]

(d) blue (e) black

Coating-normalised biofilm fouling reflectance (f) yellow wavelength [nm]

Systematic error parameters expected
with a static spectral index calibration

Minimum of coating reflectance at relevant wavelengths
(NDVI -673nm, 800nm; rNorm -673nm)

ESTIMATING BIOFILM BIOMASS ON OBJECTS IN AN AQUATIC ENVIRONMENT

CROSS-REFERENCE TO RELATED APPLICATIONS

This application is a 35 U.S.C. § 371 national phase application of PCT Application No. PCT/EP2021/076725 (published as WO 2022/069505 A1), filed on Sep. 29, 2021, which claims priority to U.S. Application No. 63/086,852, filed on Oct. 2, 2020 and EP Application Serial No. 20210887.4, filed on Dec. 1, 2020, each of which are incorporated herein by reference in its entirety.

FIELD OF THE INVENTION

The present invention relates to a method and system for estimating the biomass of biofilm fouling on objects in an aquatic environment.

BACKGROUND TO THE INVENTION

Fouling is a common problem for structures that are permanently or intermittently immersed in an aquatic environment. Such structures include hulls and ballast tanks of ships, boats and yachts; fixed and floating structures for offshore oil and gas exploration, production and storage; offshore structures for wind and wave energy generation; and conduits and pipelines.

Problems with fouling include increased fuel costs for boats due to increased frictional resistance. On static structures, for example on drilling rigs, it can alter the water flow around the supporting legs, risking unpredictable and increased stresses. It can also obscure defects and cracks during inspections. Fouling can further reduce the cross-sectional area of pipework such as cooling water or ballast tank intakes, leading to reduced flow rates. Fouling control coatings can be used to reduce fouling growth, but such coatings do not completely prevent adhesion of organisms or biofilm formation.

Fouling can broadly be separated into two categories, namely macrofouling (barnacles etc.) and micro-fouling (biofilms/slime). Having a quantitative method that can measure how much fouling (i.e. both macrofouling and microfouling) is present on an object in an aquatic environment can help estimate the additional drag, and/or determine the need for cleaning and/or recoating of the object.

Biofilms responsible for microfouling generally contain pigmented microalgae and/or bacteria. These often contain photosynthetic pigments such as chlorophyll a. In-vivo chlorophyll a absorbs light very strongly at about 673 nm, and biofilms tend to be mostly transparent in near infrared wavelengths. Therefore, it is possible to estimate how much chlorophyll is in a typical fouling biofilm sample by measuring how much red light it reflects, and often by comparing this to the baseline measurement of near infrared reflection (depending on which index of biomass is used).

Although quantitative imaging of biofilms has been done before, the biofilms have generally been treated mostly as homogenous materials with characteristic absorption properties. These models generally do not provide satisfactory results and/or cannot be used for many different objects. Therefore, there is a need to improve the quantitative determination of biofilm fouling.

SUMMARY OF THE INVENTION

An object of the invention is to provide a method and system for estimating aquatic environment-originating biofilm biomass on a coating of an object, e.g. that is immersed permanently or intermittently in an aquatic environment, that is relatively accurate, can be used on a variety of objects and is easy to implement.

One aspect the invention provides a method for estimating aquatic environment-originating biofilm biomass on a coating, such as on an object that is immersed permanently or intermittently in an aquatic environment. Such an object can e.g. be a hull or ballast tank of a ship, boat or yacht; a fixed or floating structure for offshore oil and gas exploration, production and storage; an offshore structure for wind or wave energy generation; or a conduit or pipeline. The aquatic environment can e.g. be a marine, fresh water or brackish water environment.

The method includes a step a) of obtaining one or more digital images of a fouled portion of the coating on the object. Each digital image of the one or more digital images can be obtained in a spectral band. The spectral band can e.g. have a spectral width in the range of 0-100 nm or more. Here a spectral width of 0 nm indicates a single wavelength. Hence, a single wavelength herein is also considered to be a spectral band. The spectral band can e.g. have a spectral width in the range of 0-100 nm FWHM (full width at half maximum) or more. Mutually different digital images can be obtained in the same or in different spectral bands. Each digital image can include one or more pixels.

The method includes a step b) of determining from each of the one or more images a respective reflectance value for the portion of the coating.

The method includes a step c) of determining on the basis of the one or more reflectance values a value of a spectral index representative of biomass.

The method includes a step d) of calculating a biomass pigment surface area density, $biomass_{SI}$, on the basis of the spectral index, SI, and one or more calibration values determined for a reference coating. The reference coating can be different from, e.g. have a different color than, the coating of the object. While this calculated biomass pigment surface area density may be a measure for biofilm biomass, it has been found that the value of this determined density is affected by the reflectance of the underlying coating of the object. Therefore, this determined density is not a reliable indicator for biofilm biomass as it may overestimate or underestimate biomass depending on the reflectance of the coating of the object.

Thereto, the method includes a step e) of compensating the thus calculated biomass pigment surface area density, $biomass_{SI}$, for the reflectance of the coating of the object by applying a compensation associated with the difference of the reflectance of the coating of the object relative to the reference coating, thus obtaining an estimated biomass density on the current coating surface, $biomass_{current}$. Hence, reflectance of the underlying coating of the object is compensated for, so that biofilm biomass can be determined more accurately. Moreover, according to the present method there is no need for calibrating biomass pigment surface area density, $biomass_{SI}$, versus spectral index for each and every coating. The calibration can be done for a reference coating, and the difference between the actual coating on the object and the reference coating is then compensated for. The method can be a computer implemented method.

Optionally, the compensation is based on a comparison reflectance value representative for the portion of the coating underlying the biofilm biomass. Thus the reflectance value of the coating underlying the biomass in the one or more images can be taken into account through the comparison reflectance value. The comparison reflectance value can be a reflectance value determined for a part of the coating of the object from which all biomass has been removed; a reflectance value determined from a reference object; or a reflectance value stored in a database. The comparison reflectance value can be a minimum value of the reflectance value for the coating underlying the biofilm biomass in the one or more spectral bands in which the one or more images are obtained.

Thus, in step d) the biomass pigment surface area density, $biomass_{SI}$, can be determined as if the current coating were a reference coating having a reference reflectance spectrum. Then in step e) biomass density on the current coating surface, $biomass_{current}$, can be estimated by compensating the biomass pigment surface area density, $biomass_{SI}$, determined for the reference coating for the difference of reflectance of the current coating relative to the reference coating. Optionally, reflectance of the reference coating is determined at a predetermined wavelength, and reflectance of the current coating is determined at the same predetermined wavelength for determining the difference of reflectance of the current coating relative to the reference coating.

Optionally, the biomass estimation calculated from the Spectral Index and one or more calibration values, $biomass_{SI}$, can be adjusted by an Error Factor, $EF_{current}$, and Baseline Error, $BE_{current}$, both of which are functions of the reflectance spectrum of the current coating upon which the biomass is present. Then the estimated biomass on the current coating, $biomass_{current}$, can be determined from the equation $$biomass_{current} = biomass_{SI} * \left(1 - \left(\frac{EF_{current}}{1 + EF_{current}}\right)\right) - BE_{current}. \quad \text{EQ 1}$$

Optionally, the spectral band is 100 nm wide, FWHM, or less, such as 50 nm wide, FWHM, or less, such as 30 nm wide, FWHM, or less, such as 5 nm FWHM, or less. The spectral band can be at least 0.1 nm, for example at least 1 nm. Thus, the spectral band can be in the range of from 0.1 to 100, 0.1 to 50, 0.1 to 30 or 0.1 to 5, such as from 1 to 100, from 1 to 50 or from 1 to 30 or from 1 to 5.

Optionally, at least one of the spectral bands is chosen to encompass an absorption wavelength of chlorophyll, such as chlorophyll a. When obtaining a single digital image of the fouled portion of the coating on the object, the spectral band can be chosen to encompass an absorption wavelength of chlorophyll. When obtaining two or more digital images of the fouled portion of the coating on the object, at least one of those images can be obtained in the spectral band encompassing an absorption wavelength of chlorophyll. When obtaining two or more digital images of the fouled portion of the coating on the object at least one of the images can be obtained in a spectral band chosen to exclude an absorption wavelength of chlorophyll. Hence, the presence of biomass can be determined from the absorption of light by chlorophyll.

In embodiments, the spectral band lies within the range of 350 to 900 nm, for example in the range of from 400 to 850 nm, i.e. the spectral band encompasses one or more wavelengths falling within the above ranges. Optionally at least one of the spectral bands is chosen around 433, 460, 496, 555, 584, 601, 673, or 800 nm, i.e. such that the spectral band either is or encompasses any of the specified wavelengths. At least one of the spectral bands can be chosen to be within the range of 390-480 nm, 410-510 nm, 440-550 nm, 500-610 nm, 525-645 nm, 540-660 nm, 605-740 nm, or 720-900 nm.

Optionally, the spectral index determined in step c) includes a ratio of two reflectance values. The ratio of reflectance values allows normalization of the reflectance value, e.g. relative to reflectance of the object coating. Optionally, the spectral index determined in step c) includes a sum and/or difference of two reflectance values. One of the reflectance values can be for a spectral band encompassing an absorption wavelength of chlorophyll. The other of the reflectance values can be for a spectral band not encompassing an absorption wavelength of chlorophyll. Hence, the relative effect of the absorption of light by chlorophyll can be accounted for.

Optionally, the spectral index, SI, determined in step c) is one of:

coating normalized red reflectance defined as $$SI = rNorm673 = \frac{R673}{R673_{clean}};$$

or

Normalized Difference Vegetation Index defined as $$SI = NDVI = \frac{R800 + R673}{R800 - R673}.$$

It will be appreciated, however, that other spectral indices may be used, such as (but not limited to) Microphytobenthos Index, defined as $$SI = MPBI = \frac{2 \cdot R584}{R496 + R673} - 1,$$

Ocean Color Index, defined as $$SI = OC = \frac{R443}{R555},$$

or Diatom Index, defined as $$SI = I_{diatom} = \frac{2 \cdot R601}{R460 + R673} - 1.$$

Herein R433 is the determined reflectance value in the range of 390-480 nm, such as at 433 nm; R460 is the determined reflectance value in the range of 410-510 nm, such as at 460 nm; R496 is the determined reflectance value in the range of 440-550 nm, such as at 496 nm; R555 is the determined reflectance value in the range of 500-610 nm, such as at 555 nm; R584 is the determined reflectance value in the range of 525-645 nm, such as at 584 nm; R601 is the determined reflectance value in the range of 540-660 nm, such as at 601 nm; R673 is the determined reflectance value in the range of 605-740 nm, such as at 673 nm; R800 is the determined reflectance value in the range of 720-900 nm, such as at 800 nm; $R673_{clean}$ the reflectance value in the range of 605-740 nm, such as at 673 nm at the coating of the object without biomass, such as a determined reflectance value at a cleaned portion of the object, a reflectance value of a reference having the same or similar coating as the object or a stored reference reflectance value. The spectral indices can be used for estimating the biomass pigment surface area density in step d). It has been found that the spectral indices coating normalized red reflectance and Normalized Difference Vegetation Index provide a good estimate of biomass pigment surface area density.

From the above it can be seen that the coating normalized red reflectance can be determined from a single digital image of the fouled portion of the coating on the object in a spectral band, in combination with a stored value for $R673_{clean}$. In the other instances the spectral index is determined from two or more digital images of the fouled portion of the coating on the object in mutually different spectral bands. The two or more images could be separate layers of a hyperspectral image.

The calculating of the biomass pigment surface area density in step d) is based on one or more calibration values. The calibration values can be determined for a reference coating having a predetermined reflectance. According to the present disclosure, the reference coating need not be the current coating on the object. The step e) is provided for compensating the biomass pigment surface area density calculated on the basis of the current coating for the reflectance of the coating of the object by applying a compensation associated with the reflectance of the coating of the object relative to the reference coating.

Optionally, in step d) the pigment surface area density is determined from $$\text{pigment surface area density} = \left(\frac{SI - c}{a}\right)^{\frac{1}{b}} \qquad \text{EQ2}$$

wherein SI is the spectral index value and a, b and c are calibration values. The calibration values a, b and c can be determined for the reference coating having a predetermined reflectance.

In an example, the calibration values a, b and c have been determined for a reference coating having a grey color and a reflectance value of 24%. In that case, the following calibration values have been found.

if the spectral index is the coating normalized red reflectance, a=−1.921, b=0.093, c=2.477; and if the spectral index is the Normalized Difference Vegetation, a=0.618, b=0.240, c=−0.321.

Since these calibration values result in step d) in an estimated biomass pigment surface area density, $biomass_{SI}$, applying if the current coating were the reference coating, in step e) the estimated biomass pigment surface area density, $biomass_{SI}$, can be compensated for the reflectance difference of the current coating of the object relative to the reference coating by applying a compensation associated with the reflectance of the coating of the object relative to the reference coating. As indicated above, the estimated biomass on the current coating, $biomass_{current}$, can be determined from the equation EQ1. Thus, when combining equations EQ1 and EQ2 the biomass pigment surface area density for the current coating, $biomass_{current}$, can be determined from:

$$\text{biomass}_{current} = \left(\frac{SI - c}{a}\right)^{\frac{1}{b}} \cdot \left(1 - \left(\frac{EF_{current}}{1 + EF_{current}}\right)\right) - BE_{current} \qquad \text{EQ3}$$

It will be appreciated that the steps d) and e) can be performed as separate steps, or as a combined step. For example, equations EQ1 and EQ2 can be used when performing the steps d) and e) separately. The equation EQ3 can for instance be used when performing the steps d) and e) as a combined step.

The following exemplary Error Factor, $EF_{current}$, and Baseline Error, $BE_{current}$, values have been found:

if the spectral index is the coating normalized red reflectance, $EF_{current}$=0.26 $\ln(R_{current673})$−1.00; $BE_{current}$=0.0862 $\ln(R_{current\ 673})$+0.0164;

if the spectral index is the Normalized Difference Vegetation, $EF_{current}$=0.24 $\ln(R_{current673})$−0.83; $BE_{current}$=0.025 $\ln(R_{current\ 673})$+0.1025;

wherein $R_{current673}$ is the reflectance value of the current coating at 673 nm. Using these calibration curves the Error Factor, $EF_{current}$, and Baseline Error, $BE_{current}$, values for a particular coating on the object can be determined. Thus, it is possible to determine an estimate for the biomass pigment surface area density for the current coating, $biomass_{current}$, using the calibration values a, b and c determined for a reference coating and the Error Factor, $EF_{current}$, and Baseline Error, $BE_{current}$, values compensating for the difference of reflectance of the current coating relative to the reference coating.

Optionally, the one or more digital images are obtained using a submarine, such as an unmanned submarine. The submarine can include a digital camera, such as a hyperspectral camera. Alternatively, or additionally, the one or more digital images can be obtained by a diver, hull crawler, imaging unit lowerable along the object, a (dry dock) photo booth, or the like.

According to another aspect of the invention, there is provided a system for estimating aquatic environment-originating biofilm biomass on a coating on an object, that is e.g. immersed permanently or intermittently in an aquatic environment. The system includes a processor. The processor is configured for obtaining one or more digital images of a fouled portion of the coating on the object. The processor is configured for determining from each of the one or more images a respective reflectance value for the portion of the coating. The processor is configured for determining on the basis of the one or more reflectance values a value of a spectral index representative of biomass. The processor is configured for calculating a biomass pigment surface area density on the basis of the spectral index, SI, and one or more calibration values determined for a reference coating. The processor is configured for compensating the calculated biomass pigment surface area density for the reflectance of the coating of the object by applying a compensation associated with the reflectance of the coating of the object.

Optionally, the system includes a digital camera. The digital camera can be used for obtaining the one or more images. An image obtained by the camera can be obtained a spectral band. The camera can e.g. be a general purpose digital camera, wherein one or more of the red, green and blue channels, and optionally an infra-red channel, of the camera can be used as the spectral band. The digital camera can include a spectral band filter, e.g. having a band width of 0-100 nm FWHM. The camera can be a multispectral camera. The multispectral camera can e.g. have a red spectral band from about 600 nm to about 700 nm. The multispectral camera can have an infra-red spectral band from about 750 nm to about 950 nm or higher. The multispectral camera can e.g. have a blue spectral band from about 400 nm to about 500 nm. The multispectral camera can e.g. have a green spectral band from about 500 nm to about 600 nm. The camera can be a hyperspectral camera.

The digital camera can be held by a diver. Optionally, the system includes a submarine, such as an unmanned submarine, for obtaining the images of the object below the water line. Alternatively, or additionally, the system includes a hull crawler, an imaging unit lowerable along the object, a (dry dock) photo booth, or the like.

According to a further aspect of the invention, there is provided a computer program product for estimating biofilm biomass on a coating on an object that is immersed permanently or intermittently in an aquatic environment including computer implementable instructions which when implemented by a programmable computer cause the computer to:

obtain one or more digital images of a fouled portion of the coating on the object;

determine from each of the one or more images a respective reflectance value for the portion of the coating;

determine on the basis of the one or more reflectance values a value of a spectral index representative of biomass;

calculate a biomass pigment surface area density on the basis of the spectral index, SI, and one or more calibration values determined for a reference coating; and compensate the calculated biomass pigment surface area density for the reflectance of the coating of the object by applying a compensation associated with the difference of the reflectance of the coating of the object relative to the reference coating.

The computer program product can be stored on a non-volatile memory device.

It will be appreciated that all features and options mentioned in view of the method apply equally to the system and computer program product, and vice versa. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

Figure 1:
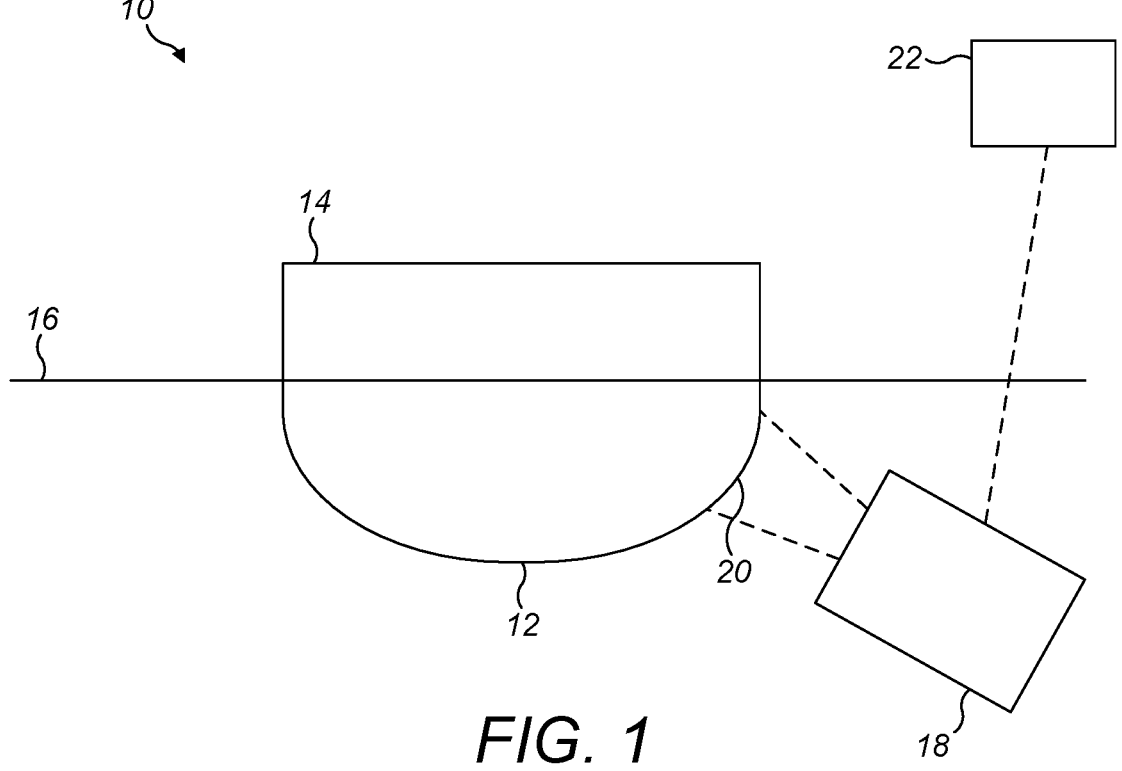
FIG. 1 shows an example of a system.

Objects immersed permanently or intermittently in an aquatic environment are prone to fouling by biofilms. Such fouling biofilms are generally comprised of diverse communities of microbial organisms embedded in an extracellular matrix that the cells exude. The matrix provides adhesion, cohesion and protection. Example microbes generally responsible for biofilm matrix formation include bacteria, archaea, and microalgae such as cyanobacteria and protozoa. Because these types of microbes are key constituents, aquatic fouling biofilms are interchangeably referred to as microfouling. It is possible, however, for fouling biofilms to include other passengers incorporated into the matrix, such as detritus or non-living sediment, embedded cells which are usually categorized as planktonic (e.g. phytoplankton), or small multi-cellular organisms such as fungi or minor filamentous algae.

To reduce fouling growth, immersed surfaces, (e.g. ship hulls, static oil rigs, marine renewable devices) can be coated in marine fouling control coatings which deter, although not completely prevent, biological growth.

Quantitative characterisation of the marine biofilms found on fouling control coatings provides insight as to the coating modes of action and efficacy. Microscopy, phospholipid analysis, microelectrodes, and optical coherence tomography are among the many techniques that have been used to explore biofilm processes. A commonality across these methods is they hinge on collection and/or analysis of small biofilm samples, but this has limited practicality to capture variability in biofouling across a large object, such as a vessel. It has been found that hyperspectral imaging is highly suitable to map fouling by pigmented organisms such as algae, microalgae and/or bacteria, such as photosynthetic algae, microalgae and/or bacteria.

Biofilms that foul immersed objects, such as ships, are generally phototrophic. Diatoms are usually reported as the primary microalgal constituent taxon in fouling biofilms. Other microalgal phototrophs reported in fouling biofilms include cyanobacteria and additional eukaryotes. Pigmented bacteria and/or algal biomass can be characterised by spectral reflectance data, as algal taxa have characteristic pigments (e.g. photosynthetic and accessory pigments) which result in characteristic reflectance spectral features. Chlorophyll a, herein also denoted as Chl a, the pigment common to all photosynthetic groups, for example, absorbs strongly at about 670 nm and this feature generally does not overlap with any other pigment peaks.

Spectral imaging captures quantitative spectral reflectance data and so is well suited to examining large spatial processes relating to algal biomass as can be determined from algal spectral characteristics. Spectral imaging readily scales, in contrast to sample-derived biofilm characterisation methods, and thus has high potential for characterising immersed object biofilm fouling processes. The image obtained by spectral imaging can include one or more pixels.

An advantage of the present disclosure is that it is possible to map fouling over large areas to give an overall picture of the fouling on the structure, and hence can help to identify any problem areas that may need particular attention, e.g., cleaning. However, it can also be adapted to be used over smaller areas, even individual pixels, such that more rapid information on specific areas of interest can be obtained.

Hyperspectral imaging can quantify and map biomass using hyperspectral biomass indices calibrated to algal pigment concentrations. Chlorophyll a is an established proxy of primary productivity and biomass, and so can be adopted for hyperspectral calibration. Chl a can be indexed by comparing the absorbance feature depth at about 670 nm with reflectance at a reference wavelength in near infrared or blue which are less influenced by other pigments. Examples are the Normalised Difference Vegetation Index, NDVI, or Microphytobenthos Index, MPBI. Additional indices which quantify euglenid (green algae) and diatom (brown algae) biomass have also been developed.

Biofilm reflectance spectra are modified by the spectra of the underlying substrata. In marine shipping, colourful marine fouling control coatings are the substrata, so accounting for their spectral signatures is necessary when taking spectral measurements of biofilm fouling. Biocidal antifouling coatings are very commonly red or reddish-brown due to higher copper oxide content, for example, and coatings applied to floating marine renewable platforms are required to be yellow for high visibility, while yacht anti-fouling coatings are formulated in a rainbow of colours. These coloured coatings all have non-flat reflectance spectra, so methods can be used to ensure the spectral reflectance of the background coating does not skew experimental results.

Figure 12:
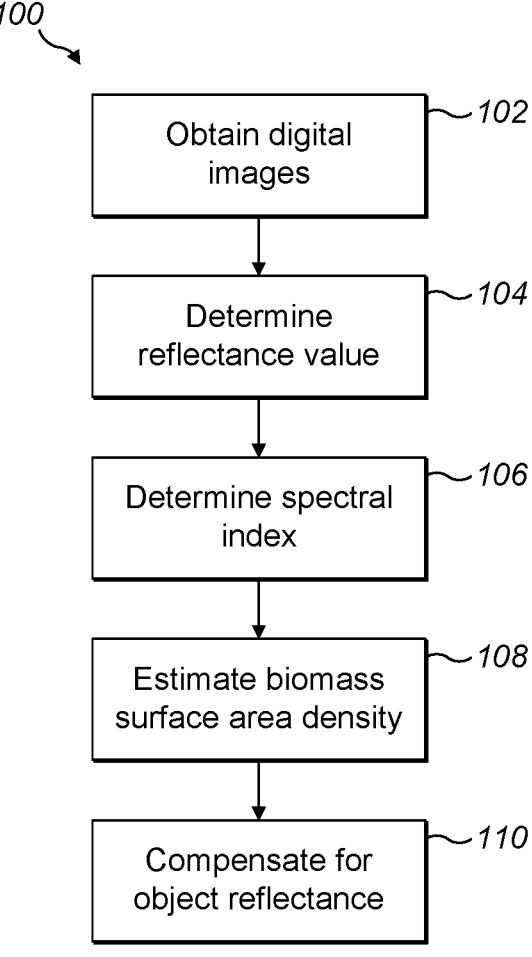
FIG. 12 shows a schematic representation of a method.

FIG. 12 illustrates a method 100 for estimating aquatic environment-originating biofilm biomass on a coating of an object, that is e.g. immersed permanently or intermittently in an aquatic environment. The method includes:

a) obtaining 102 one or more digital images of a fouled portion of the coating on the object in a spectral band;

b) determining 104 from each of the one or more images a respective reflectance value for the portion of the coating;

c) determining 106 on the basis of the one or more reflectance values a value of a spectral index representative of biomass;

d) calculating 108 on the basis of the spectral index, SI, and one or more calibration values a biomass pigment surface area density; and e) compensating 110 the calculated biomass pigment surface area density for the reflectance of the coating of the object by applying a compensation associated with the reflectance of the coating of the object.

Examples of the steps a) through e) will be described in more detail below.

FIG. 1 shows an example of a system 10 for estimating aquatic environment-originating biofilm biomass on a coating 12 on an object 14, that is e.g. immersed permanently or intermittently in an aquatic environment. In this example, the object 14 is a vessel, partially submerged below water line 16. In this example, the system 10 includes a digital camera 18, such as a hyperspectral camera, arranged for obtaining one or more digital images of a fouled portion 20 of the coating on the object 14 in a spectral band. The spectral band can e.g. have a spectral width in the range of 0-100 nm FWHM (full width at half maximum). The digital camera can include one or more pixels. The digital camera can include a 1D sensor array, sometimes referred to as line-scan camera. The digital camera can include a 2D sensor array.

The system 10 includes a processor 22 connected or connectable to the camera 18. The processor can be part of an under-water portion of the system. It is also possible that the processor is part of an above-water portion of the system. The processor 22 is arranged for obtaining one or more digital images of a fouled portion of the coating on the object from the camera. The processor 22 is arranged for determining from each of the one or more images a respective reflectance value for the portion of the coating. The processor is arranged for determining on the basis of the one or more reflectance values a value of a spectral index representative of biomass. The processor 22 is arranged for calculating a biomass pigment surface area density on the basis of the spectral index, SI, and one or more calibration values determined for a reference coating. The processor 22 is arranged for compensating the calculated biomass pigment surface area density for the reflectance of the coating of the object by applying a compensation associated with the difference of the reflectance of the coating of the object relative to the reference coating. This will be explained in more detail below.

The following experiments demonstrate that a good estimate for microfouling biomass can be achieved by compensating the calculated biomass pigment surface area density for the reflectance of the coating of the object by applying a compensation associated with the reflectance of the coating of the object.

Biofilm Experiments

The experiments were based on cultured microalgal and bacterial biofilms approximating what has been observed in real world marine microbial ship fouling. Monoculture biofilms of various densities were prepared. The monoculture species were selected from algal groups that have been reported in literature as present in microfouling assemblages and/or observed in fouling biofilm samples. Mixed population microalgal and bacterial biofilms seeded from sampled marine fouling were also prepared and tested to provide insight as to the effect of taxonomic heterogeneity.

The biofilms were grown on glass and the fouled glass positioned over each of six coating colours for spectral imaging, so that the same biofilms could be measured with different colour backgrounds.

Biofilm Cultures

Monocultures: Monocultures of two diatom species (*Achnanthes* sp, CCAP1095/1, *Amphora* sp, CCAP1001/3), a green algae (*Chlorella* sp, CCAP211/53), and a cyanobacterium (*Nodularia* sp, CCAP1452/6) were obtained from the Scottish Association of Marine Science Culture Collection of Algae and Protozoa (SAMS CCAP). For each species, the original seed cultures (20 mL) were scaled up to 3×125 mL cell suspensions at 18° C. under a 12 hour on/off light cycle (Sylvania T8 fluorescent white cool 840+white warm 840 (Lorenz et al., 2005, Maintenance of Actively Metabolizing Microalgal Cultures. Algal culturing techniques, 145). The microalgae were cultured as per the CCAP specifications in nutrient-enriched artificial sea water microalgal growth media: Guillard's f2+Si—a general marine microalgal growth medium with an addition of silica to support diatom growth (*Achnanthes, Amphora*), Guillard's f2— without the silica (*Chlorella*), (Guillard and Ryther, 1962, Studies of marine planktonic diatoms: I. Cyclotella nana Hustedt, and Detonula confervacea (Cleve) Gran. Canadian journal of microbiology, 8, 229-239), or Blue Green Media—developed for culture of blue-green algae (*Nodularia*) (Stanier et al., 1971, Purification and properties of unicellular blue-green algae (order Chroococcales). Bacteriological reviews, 35, 171).

Mixed population culture HP (Hartlepool): The source populations for the HP culture were biofilms collected from non-toxic panels immersed approximately 0.5 m below the surface for 3-6 months in Hartlepool Marina on the north-eastern English coast. The biofilm samples were blended in Guillard's f2+Si media to create a 500 mL cell suspension and filtered through a 125 μm filter to remove large particles.

Mixed population culture IP (International Paint): The source populations for the IP culture were biofilms collected from non-toxic panels immersed approximately 0.5 m below the surface for 1 month in Raffles Marina, Singapore. The biofilm samples were blended in seawater to create a cell suspension and filtered through a 125 μm filter to remove large particles. The 1 L cell suspension culture was scaled up at 25° C. under a 12 hour on/off light cycle (58 W Marine White, Actinic Blue, Arcadia) in International Paint's 250 L recirculating mixed population autotrophic marine biofilm culturing system Longyear, 2014, Section 2 Mixed population fermentor. Biofouling Methods, 214) containing artificial seawater enriched with Guillards f2+Si nutrient medium.

Biofilm Formation

All biofilms were grown on glass cover slips (circular 19 mm diameter, Fisher Scientific). As they are fragile, the cover slips were placed on glass microscope slides (25×75 mm, Fisher, 2-3 per slide) for support and secured with microplate sealing film. The sealing film was pre-punctured with circular holes (9 mm diameter) created with a crafting hole punch and centred on the underlying cover slips. This configuration exposed only the central area of each coverslip to fouling. When the masking films were removed after the growth period, the resulting biofilms had well defined perimeters and were surrounded by contrasting areas of clean glass.

For the monocultures and mixed culture HP, the biofilms were grown in 4-well plates (Fisher Scientific) (2-3 plates per population). In order to culture a range of biofilm densities, the ratio of inoculate (the parent cultures) to nutrient media added to each 10 mL well was increased sequentially, with the final well containing exclusively inoculate. The plates were sealed, and biofilms cultured at 18° C. under a 12 hour on/off light cycle (Sylvania T8 fluorescent white cool 840+white warm 840; (Lorenz et al., 2005, Maintenance of Actively Metabolizing Microalgal Cultures. Algal culturing techniques, 145). Every two weeks, 5 mL of nutrient media per well was replaced by serological pipetting, careful not to disrupt the biofilms, and the plates were resealed, until biofilms of visible varying densities had developed across the masking films and exposed glass. After the growth period (circa 2 months) the masking was removed and 8-12 slips with biofilms from each population were prepared for imaging.

For mixed culture IP, the slides were placed horizontally into illuminated, 8 cm deep channels integrated into the recirculating culture system. Over the course of several weeks, spatially heterogeneous biofilms colonised all surfaces of the channel, including the slides. The slides were removed from the channel and the masking removed. Coverslips fouled by a range of biofilm densities and compositions were prepared for imaging.

Instrument Configuration

Biofilms were imaged with a hyperspectral line scanning system (Resonon benchtop pikaXC, 377-1029 nm, 3.3 nm wavebands, 200 channels, 17 mm focal length Schneider objective lens, 30.8° field of view). With this instrument the sample is placed on an automated translation stage beneath the lens, the imager collects spectra for a single line of 1600 pixels in width, and the image is created by continuous capture of data at a user-defined frame rate as the sample stage is moved across the field of view (FOV). The spatial width dimension of each pixel is determined by the lens FOV and distance from the lens to the imaging surface. The length dimension of each pixel is determined by the speed of the linear translational stage and frame rate. The imaging system was set to generate approximately square aspect ratio pixels approximately 0.06 mm×0.06 mm, which allowed for the full length of a 75 mm microscope slide to be imaged within a single scan.

The translation stage was illuminated across the visible and near-infrared spectrum (in the range of about 380 nm to about 980 nm) by a four-light assembly of wide spectrum quartz halogen lamps (Resonon). The dynamic range of the images was maximised by setting the instrument exposure level manually using the lens iris so that the reflectance spectrum measured from a piece of white Teflon (Resonon) spanned, but did not saturate, the 14-bit sensitivity of the instrument.

Instrument electrical noise spectra were collected with the lens cap in place and accounted for using the instrument software (Spectranon) dark correction as specified by the manufacturer. Variable illumination across the imaging field due to the positioning of the lamps was measured by imaging a plain white Teflon panel and accounted for in the software using the standard response correction function as recommended by the manufacturer.

A Spectralon reflectance standard (50% flat spectral response from 360-1100 nm, NIST-certified) was included centrally in each experimental image field of view to allow for reflectance calibration during image processing.

Biofilm Imaging

Each biofilm was repeatedly imaged with different colour underlying backgrounds through a process of gentle repositioning of the glass coverslips on coated microscope slides.

Non-toxic backgrounds: Grey-scale (white, grey, black) and primary colour (red, yellow and blue) variants of the fouling release coating Intersleek™ 900 (International Paint, Ltd) were chosen as they represented a range of brightness levels and spectral characteristics and were also non-toxic. The coatings were applied by roller to glass microscope slides over an anticorrosive primer and fouling release tie coat (Intershield™ 300 and Intersleek™ 757), following the coating's specified application scheme. The slides were immersed in seawater in the Hartlepool Marina for several months, retrieved, and cleaned thoroughly with a sponge.

Biofilm transfers and repeat imaging: The first colour microscope slides were placed in an inverted well plate cover and filled to a shallow depth (<2 mm) with artificial seawater. Three or four cover slips with biofilms were gently placed atop each slide with forceps, taking care not to dislodge the biofilms. When all biofilms per culture (8 to 12 biofilm for each) were loaded in to the dish, the image was collected. The next set of colour slides were then placed adjacent to the first, and the cover slips were gently slid with forceps across from one colour to another, after which the first colour slides were removed. The second set of slides were centered in the dish and the second image was collected, and so on. Approximately every 2 images the water in the dish was replaced because it warmed under the halogen lamps. The order in which the colours were used was arbitrarily chosen to minimise any order effects if any small portions of biomass were dislodged during transfer (although this was rarely observed). By using this strategy spectra could be acquired from the exact same biofilms but with different colour backgrounds thus limiting background colour as the only variable.

Biofilm Pigment Analysis

Pigment analysis provided the traditional, quantitative, but destructive metric of microalgal biomass and generated the foundation dataset for post-processing spectral index calibrations.

Pigment extraction: After biofilm imaging, the biofilms and cover slips were sandwiched in glass fibre filters (0.45 μm), flash frozen, and placed in cryostorage (LN$_2$ vapour phase) until extraction (8-10 months). Algal pigments were extracted in 1 mL chilled methanol (MeOH, 100%, analytical grade) with 1 minute sonication (55 watt QSonica sonicator) to rupture cell membranes and disrupt the biofilm matrix, then syringed through an in-line 0.45 μm filter (Watman) to remove remaining sediment.

High Performance Liquid Chromatography (HPLC): HPLC analysis of the biofilm extracts followed the method outlined by Van Heukelem and Thomas (Van Heukelem and Thomas, 2001, Computer-assisted high-performance liquid chromatography method development with applications to the isolation and analysis of phytoplankton pigments. Journal of Chromatography A, 910, 31-49), adjusted to use with an Agilent HP 1100 instrument (Agilent Technologies, CA) with a diode array detector (UV signal/wavelength=450 nm/4, wavelength range 350-750 nm) and Zorbax Eclipse XDB-C8 (RP, 3.5 um, 4.6×150 mm) column. On the day of analysis, a maximum of 18 samples were first mixed with a buffer (28 mM aqueous tetrabutyl ammonium acetate (TBAA), pH 6.5) in a 1:1 preparation prior to the run, kept in amber vials, held queued at 5° C. in the chilled autosampler, and run overnight. Mobile phases A (70:30 (v/v) methanol, 28 mM aqueous TBAA, ph 6.5) and B (methanol) were introduced by a 1.1 ml/min flow following the profile [0 min: 95% A, 5% B; 22 min:5% A, 95% B; 31 min, 95% A, 5% B], with a column temperature of 60° C.

Determination of pigment area densities: The HPLC instrument and method were calibrated for peak height for sixteen microalgal pigments that are found in microalgal groups such as diatoms, green algae, cyanobacteria, dinoflagellates, and cryptophytes that are often found on microfouled ship and immersion board samples. The pigments were chlorophylls a, b and c2, peridinin, prasinoxanthin, violaxanthin, lutein, fucoxanthin, zeaxanthin, beta-carotene, diadinoxanthin; alloxanthin; myxoxanthophyll; divinyl chlorophyll a, 19-hex-fucoxanthin; and neoxanthin; from commercial supplier DHI. Experimental sample chromatograms were analysed, and peak identities confirmed by absolute and relative retention times and UV absorbance spectra for each peak related to a calibrated pigment. Concentration of the sixteen calibrated pigments [ng/mL MeOH] in each biofilm were determined from chromatogram peak height. The concentrations were converted to pigment surface area density [$\mu g/cm^2$] by dividing each pigment concentration by biofilm area, measured with the manual pixel selection tool after scaling the experimental images in ImageJ (NIH. 1.51 d).

Biomass Estimation from Hyperspectral Indices

Non-destructive hyperspectral measurements and destructive pigment analysis measurements were linked through the development of calibrated formulae to convert spectral index values into estimates of biomass.

Background Coating Reflectance Spectra

Figure 2A:
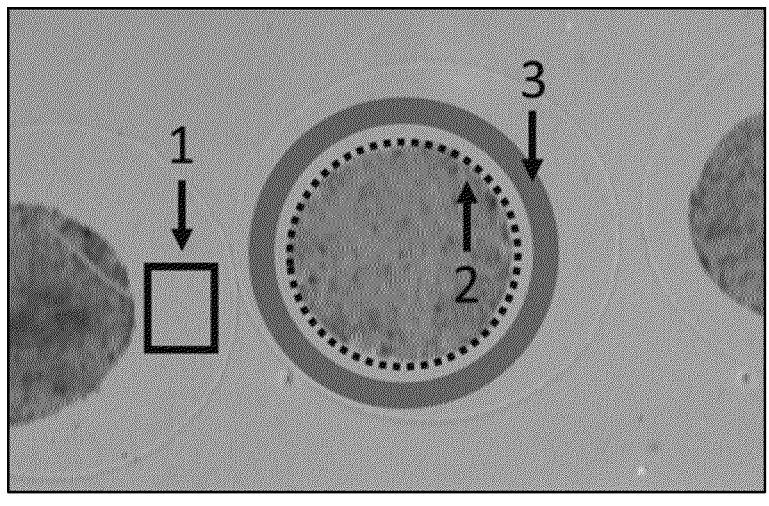
FIGS. 2A and 2B show examples of an experimental setup.
Figure 2B:
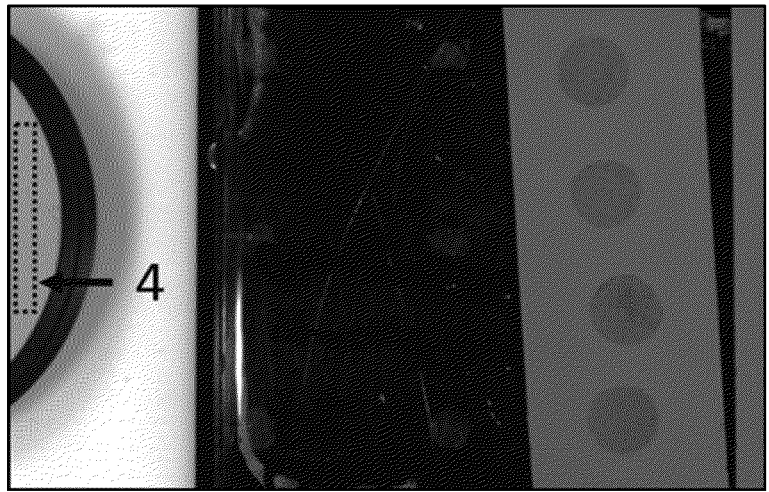

FIG. 2A shows how coating reflectance spectra were measured from clean areas of coverslip glass (solid line, 1); biofilm spectra were measured from regions of interest, ROIs, including all biomass (dotted line, 2) and paired local coating spectra were measured from ROIs of clean glass surrounding the biofilm (shaded region, 3). The mean reflectance spectra of the coatings, Rcoating, were measured from ROIs drawn around clean areas of the glass coverslips in the hyperspectral images (see FIG. 2A at 1) using the manual selection tool of the imager's software package (Spectranon, version 2.68, Resonon, MT, USA). Mean reflectance spectra of a 50% reflectance standard, Rref, (see FIG. 2B at 4) were also measured from the hyperspectral images. The measured coating spectra were converted from brightness digital number measurements [DN] to percentage reflectance of incident light [0-100%] by scaling to the spectra of the reflectance standard, where $$Rcoating[\%]=Rcoating[DN]\times0.5[\%]/Rref[DN].$$

Figure 3:
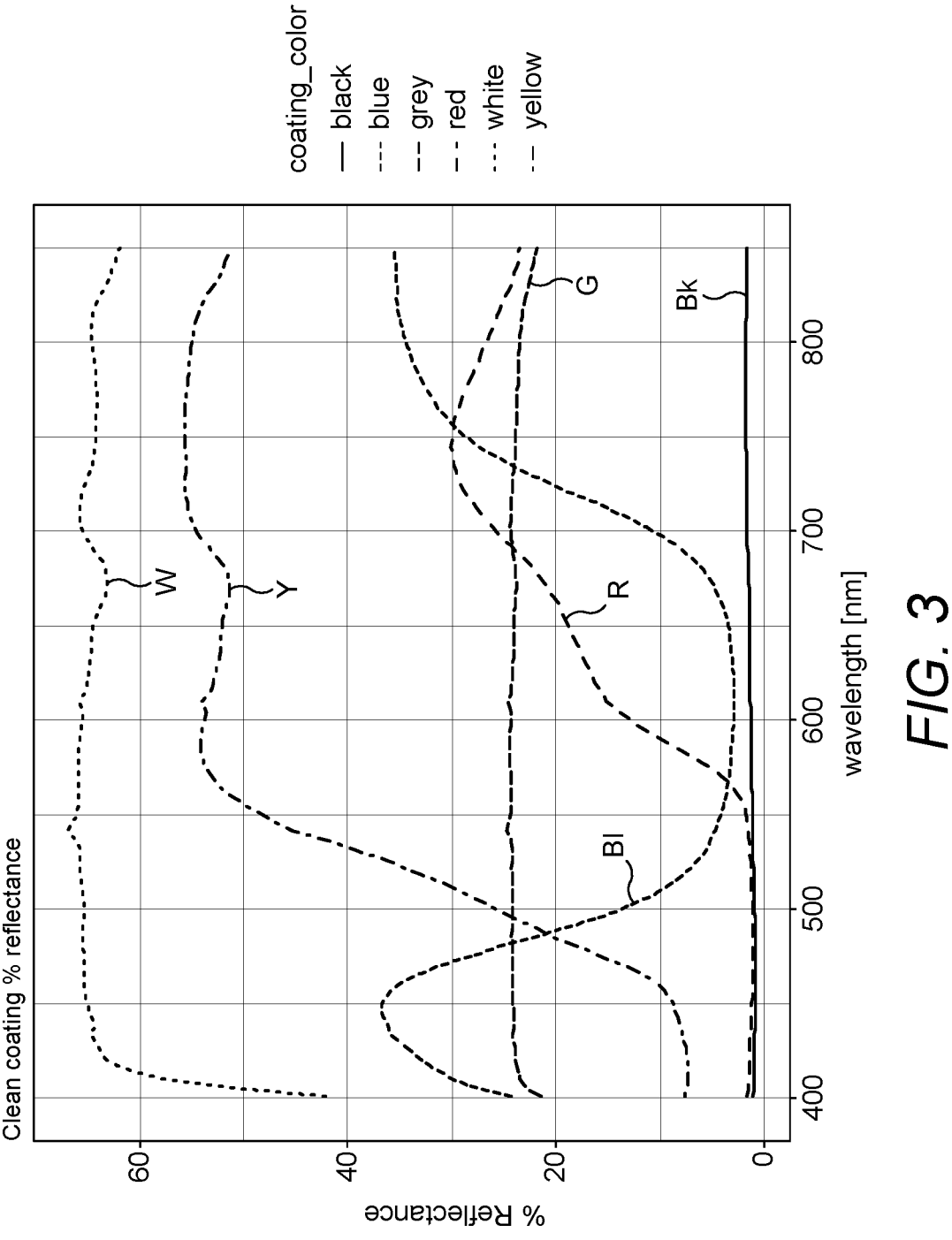
FIG. 3 shows reflectance spectra of exemplary coatings.

FIG. 3 shows that the reflectance spectra of the white (W), grey (G) and black (Bk) coatings were relatively flat (64%, 24%, and 1% mean reflectance, respectively), while the spectra of the primary-coloured coatings yellow (Y), red (R) and blue (Bl) had colour-specific reflectance and absorbance features.

In this experiment the grey (G) coating subset of the hyperspectral images was selected as reference coating for calibrating the hyperspectral indices, as the coating was found to have a flat spectral response and overall reflectivity closely matching the previously published spectra of natural sediments. It will be appreciated, however, that any other coating or substrate could be selected as reference.

Biofilm Reflectance Spectra

For each biofilm (n) of each culture (c), the mean spectrum was measured for the ROI tracing the perimeter of the biofilm, $Rbio_{m(c,n)}$, (FIG. 2A, arrow 2). A grey coating ROI local to each biofilm, $Rgrey_{m(c,n)}$, (FIG. 2A, arrow 3) was also defined, enclosing an area of clean glass coverslip surrounding the biofilm. Local coating spectra were measured because the surfaces were not perfectly flat, causing local variation in illumination.

Estimating Biomass by Spectral Indexing

Two hyperspectral indices drawn from microalgae remote sensing literature were assessed for their suitability to estimate the biomass of the spectrally variant experimental biofilms. The calibrations of the indices to pigment spatial densities were ranked by their estimation errors.

Spectral indices: The various indices combine wavelengths across the visible and near-infrared spectrum. Table 1 below provides Microalgal biomass hyperspectral index details.

Herein R673 is the determined reflectance value in the range around 673 nm, such as in the range of 605-740 nm, such as at 673 nm; R800 is the determined reflectance value in the range around 800 nm, such as in the range of 720-900 nm, such as at 800 nm; $R673_{clean}$ is the reflectance value in the range around 673 nm, such as in the range of 605-740 nm, such as at 673 nm at the coating of the object without biomass.

TABLE 1

| Index | Equation | General (G)/Specific (S) Biomass Estimator |
|---|---|---|
| Coating-normalised red reflectance | $rNorm673 = \dfrac{R673}{R673_{clean}}$ | G: a simple measure of the chlorophyll a absorbance feature at about 673 nm |
| Normalised Difference Vegetation Index | $NDVI = \dfrac{R800 - R673}{R800 + R673}$ | G: Compares chlorophyll a absorbance feature at 673 nm with an NIR baseline that is theoretically invariant with biomass (single wavelengths adopted instead of broad waveband averages) |

Index Calibrations to Biomass: Power models, fit by nonlinear least squares estimation, were defined to describe the relationships between the spectral indices calculated from the biofilm datasets, $Rbio_{norm(g)}$, and the spatial densities of select biofilm pigments, where $$index=a*pigment\ density^b+c$$

From this fit the calibration values a, b and c are determined.

Index values for the two indices rNorm and NDVI were calculated for all the normalised biofilm spectra and were compared to biofilm densities of the universal photosynthetic pigment chlorophyll a, a widely accepted biomass proxy.

Comparison of biomass estimation errors across indices: To make a quantitative assessment of how well the indices estimated biomass (measured as pigment surface area density), the power models were inverted to conversion formulae, where $$\text{pigment density} = \left(\frac{\text{index} - c}{a}\right)^{\frac{1}{b}}$$

For every biofilm, the index values calculated from Rbi-$o_{norm(g)}$ were converted to biomass estimates and the residual sum of squares and mean estimation error (estimated—measured pigment density) were calculated for all indices.

Biomass Estimation on any Colour Background

Fouling control coatings are pigmented to a range of standard and custom colours, each with characteristic spectral reflectance and absorption features of potentially higher magnitude than the spectral features of any fouling microalgae. The index calibrations derived above were tested for universal applicability to microfouling across the six coloured coatings.

Colour-Specific Coating-Normalised Biofilm Reflectance Spectra

The coating and biofilm spectra for the white, black, red, blue and yellow coating hyperspectral images were processed following the procedures outlined for the grey coating dataset: measurement of biofilm and local coating spectra (Rbio$_m$, Rcoating$_m$), conversion to percent reflectance, and normalisation of all biofilm spectra to the local coating measurement, (Rbio$_{norm(w)}$, Rbio$_{norm(bk)}$, Rbio$_{norm(r)}$, Rbi-$o_{norm(bl)}$, Rbio$_{norm(y)}$). The original grey-normalised data (Rbio$_{norm(g)}$) were also included in the analyses.

Estimations of Biomass on all Coatings

Values for the two spectral indices were calculated from the coating-normalised biofilm reflectance spectra for all six coating colours and all biofilms. The calibrated conversion formulae were then used to estimate biomass from every index value for all biofilms on all coatings.

Biomass estimation errors (estimated minus measured pigment density) were calculated for each index and each colour coating. To examine any biomass-linked estimation error patterns, errors for each coating colour dataset were compared to measured biomass and fit with linear regressions to determine baseline error (intercept) and error factor (slope). The error factor and baseline estimation error for each coating colour were compared to the minimum of the coating reflectance values at the index wavelengths. For NDVI, for example, error factor and baseline error for each colour coating were compared to the minimum of coating reflectance at 673 and 800 nm. Logarithmic equations were calculated to describe the relationships between the baseline estimation errors and error factors and coating reflectance at the index wavelengths.

Results

Biofilm Formation

Overall, the experimental culturing methods successfully resulted in six sets of spatially defined biofilms of varying densities.

Biofilm Pigments as determined by HPLC

Monocultures: Across all species, chlorophyll a was the primary pigment and was present at the highest densities. For the diatom species, fucoxanthin was also present at high levels, and notable minor pigments included chl c2, beta carotene, and, for *Amphora* sp., diadinoxanthin. The minor pigment suite for *Nodularia* sp. was limited solely to beta carotene, but additional phycobilin pigments not measurable by HPLC are likely also to have been present and contributed to structuring the biofilm reflectance spectra. The *Chlorella* sp. biofilms contained high levels of chlorophyll b, and detectable levels of the minor pigments violaxanthin, alloxanthin, zeaxanthin, lutein, and beta carotene.

Mixed cultures: For the HP biofilms, chl a was the primary pigment, with a maximum density of 1.6 μg/cm², giving a range of densities similar to most of the monocultures. Fucoxanthin was the next major pigment, confirming the observation that diatoms were abundant in these biofilms. Of the suite of remaining pigments, chl b indicated presence of green algae, alloxanthin indicated presence of cryptophytes, while high values of beta carotene were not readily attributable to any taxon.

The range of chl a densities for the IP biofilms was much greater (maximum density 6 μg/cm²) than for all other cultures barring the *Achnanthes* sp monoculture. Fucoxanthin was present only in very minor amounts, indicating diatoms were not prevalent in these samples, which agreed with the microscopy. Alloxanthin, indicative of cryptophytes, was highly concentrated in the redder biofilms, suggesting an identity for the small red-brown flagellated single cell algae observed by microscopy. Relatively high levels of chl b indicated presence of green algae, matching the bright lime green visual appearance of some of the biofilms. The diverse additional pigments, including those unidentifiable, underscored the diversity and heterogeneity of the IP biofilms.

Biomass Estimation from Hyperspectral Indices

Microalgal Biofilms Reflectance Spectra

Figure 4:
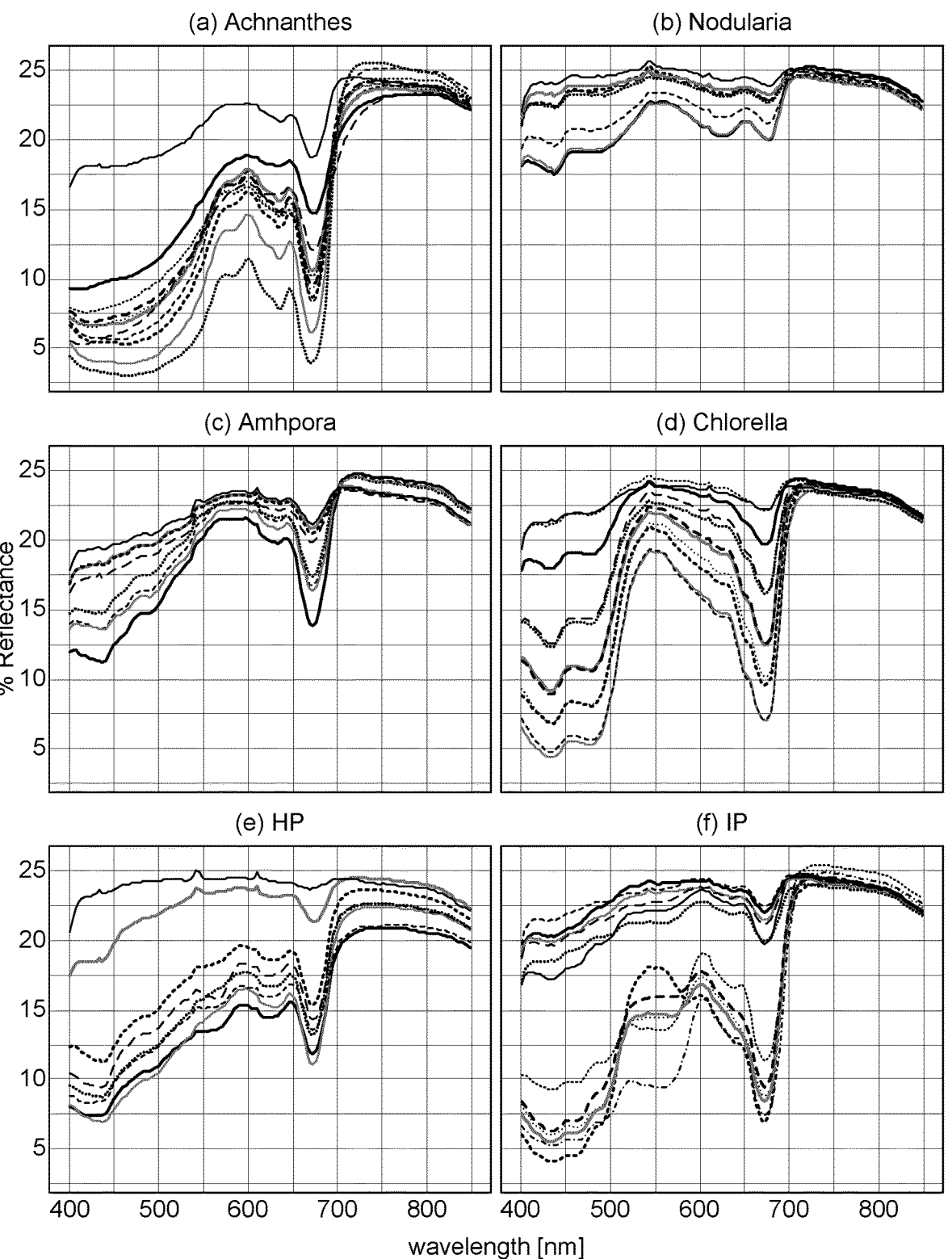
FIG. 4 shows reflectance spectra.

The measured reflectance spectra from the six sets of laboratory biofilms had varied characteristic absorbance features, which were highly visible against the background flat spectral reflectance of the grey coating as can be seen in the absorbance spectra shown in FIG. 4. FIG. 4 shows reflectance spectra of the six laboratory biofilm sets, where the y axis gives the observed reflectance range. Deepening spectral features indicate denser biomass. Panel (a) shows *Achnanthes* sp. biofilms (b) *Amphora* sp. (c) HP mixed culture biofilms (d) *Nodularia* sp. biofilms (e) *Chlorella* sp. biofilms and (f) IP mixed culture biofilms. There was significant noise in the measurements below 400 nm, as well as minimal illumination, and so the wavelengths below 400 nm were not considered further in the experiment. In the infrared there was little observable change in the reflectance spectra from 850 nm to 1100 nm apart from increasing noise, and so wavelengths above 850 nm also were not considered further in the experiment.

The spectra of all six cultures were marked by an absorbance feature at 673 nm, which is attributable to chlorophyll a and deepened as the density of the biofilms increased. The diatom biofilms displayed absorption features at about 630 nm, typical of absorbance in brown algae due to presence of chlorophyll c. The green algae biofilm reflectance spectra were marked by strong absorbance from 400-500 nm, but little absorbance around 500-600 nm. The cyanobacteria biofilms showed spectral absorbance at about 625 nm, possibly attributable to phycocyanin. The spectra of the HP mixed population biofilms closely resembled the *Amphora* sp spectra, suggesting diatoms are an important component of these biofilms. The IP biofilms had inconsistent spectra that did not map closely to any monocultures. The spectra of the greener of the biofilms were similar to the *Chlorella* sp biofilm spectra, while the spectra of the red-brown biofilms differed.

Estimating Biomass by Spectral Indexing

Figure 5B:
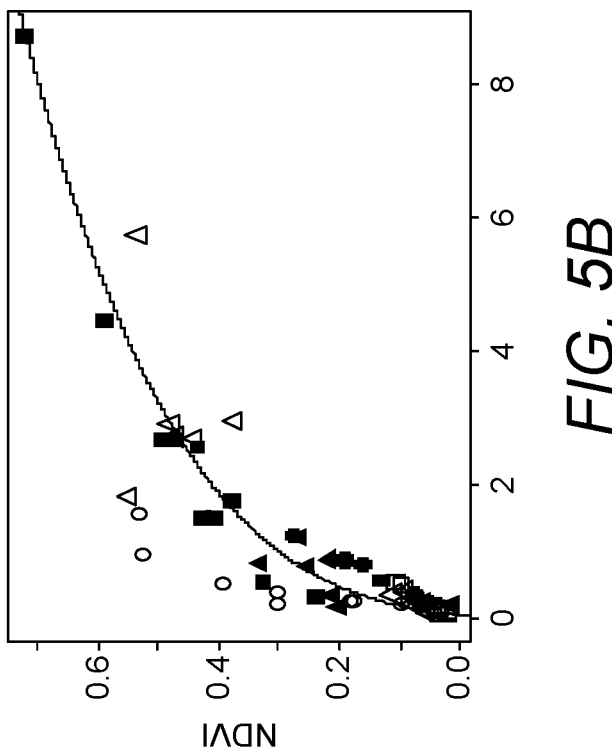
FIGS. 5A and 5B show examples of determined values of spectral indices as a function of measured chl a density.
Figure 5A:
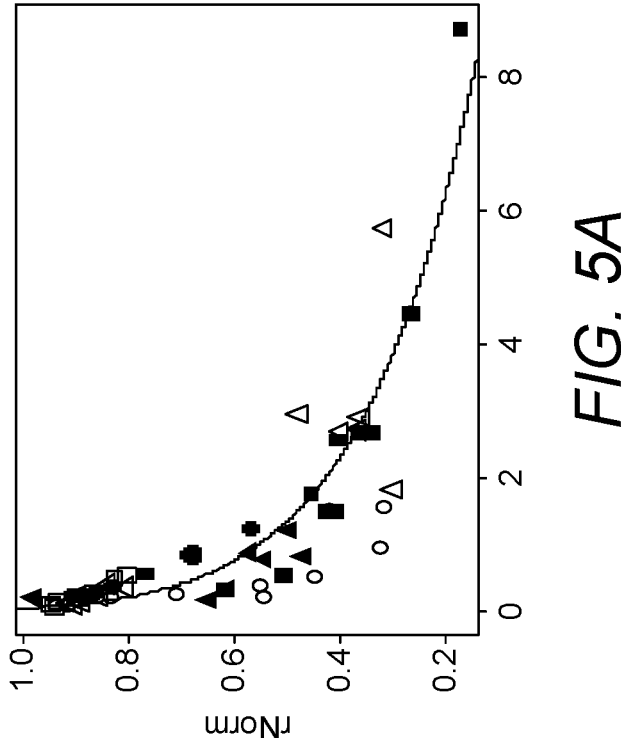
Figure 6A:
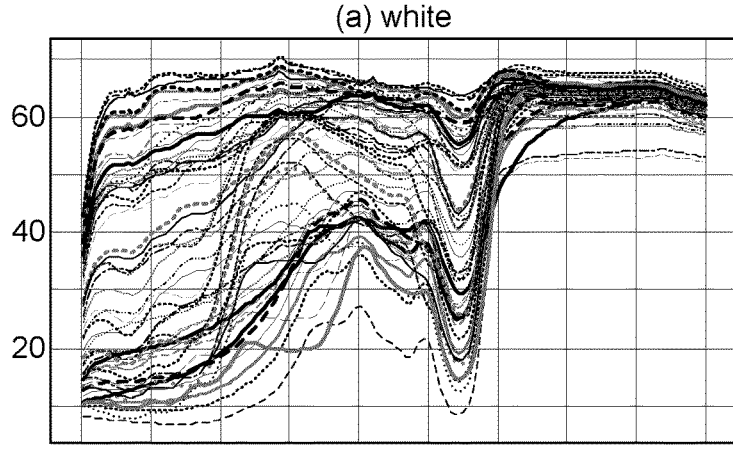
FIGS. 6A-6F show examples of measured spectra.
Figure 6B:
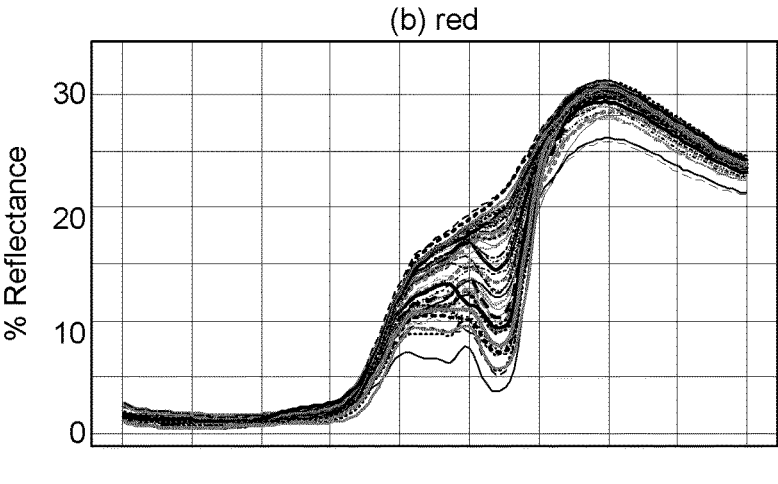
Figure 6C:
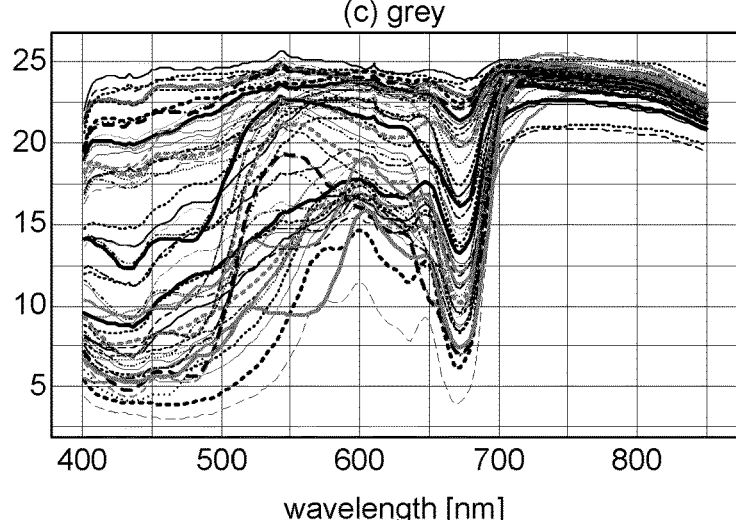
Figure 6D:
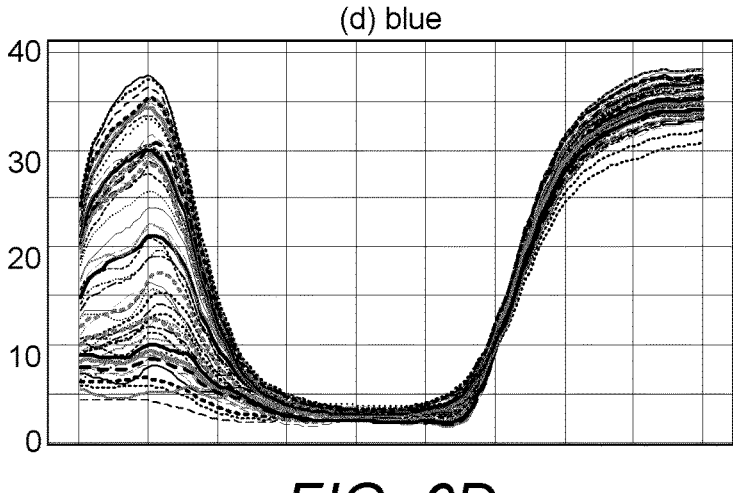
Figure 6E:
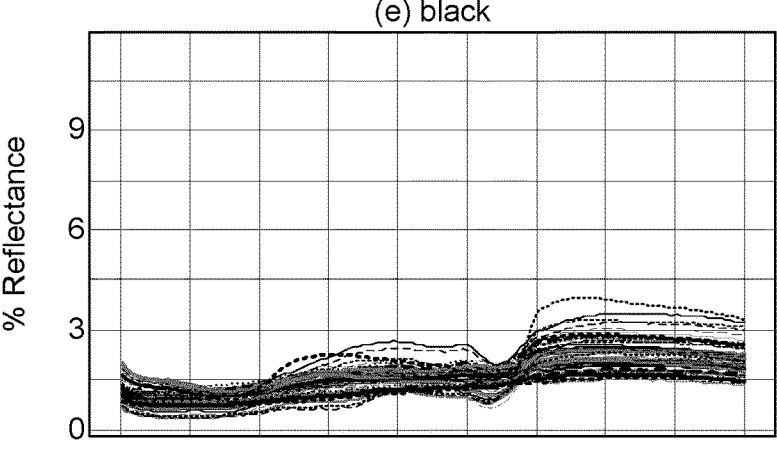
Figure 6F:
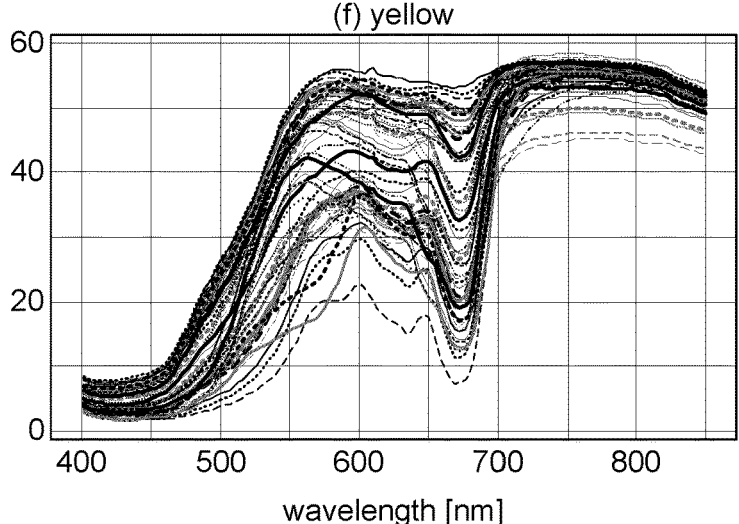
Figure 7A:
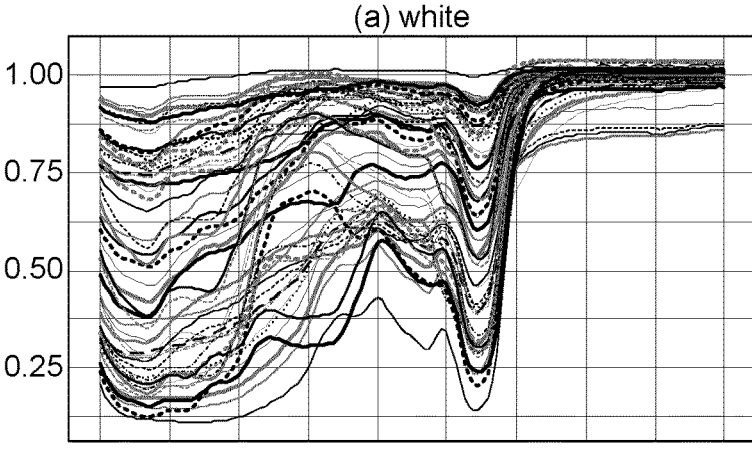
FIGS. 7A-7F show examples of normalized spectra.
Figure 7B:
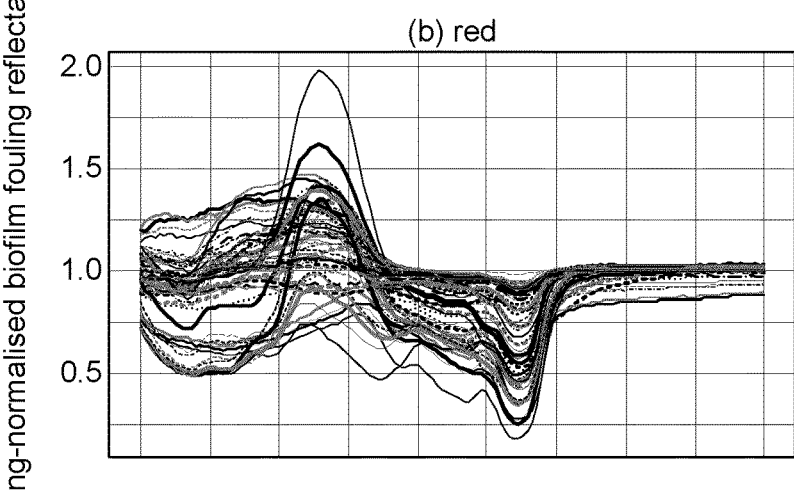
Figure 7C:
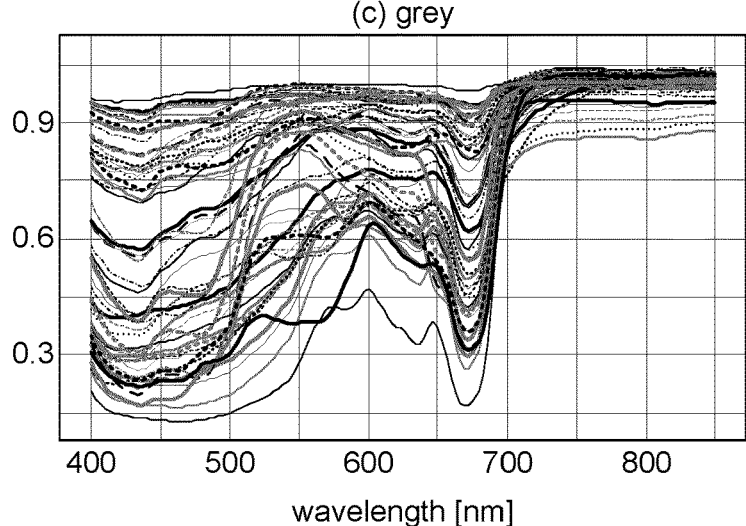
Figure 7D:
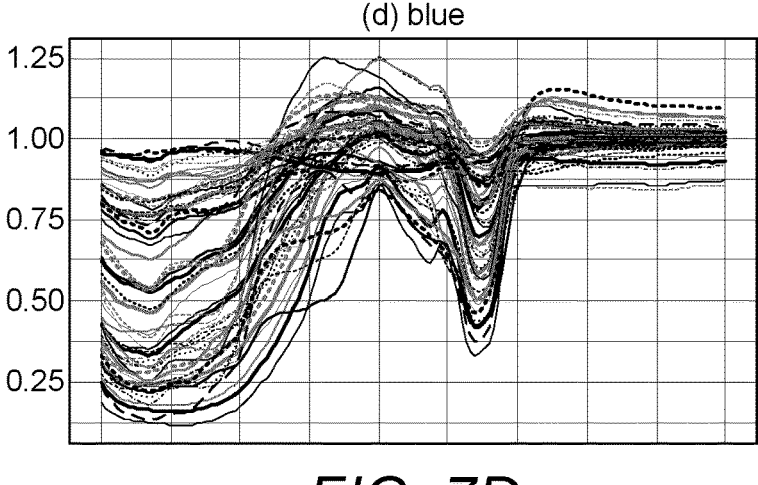
Figure 7E:
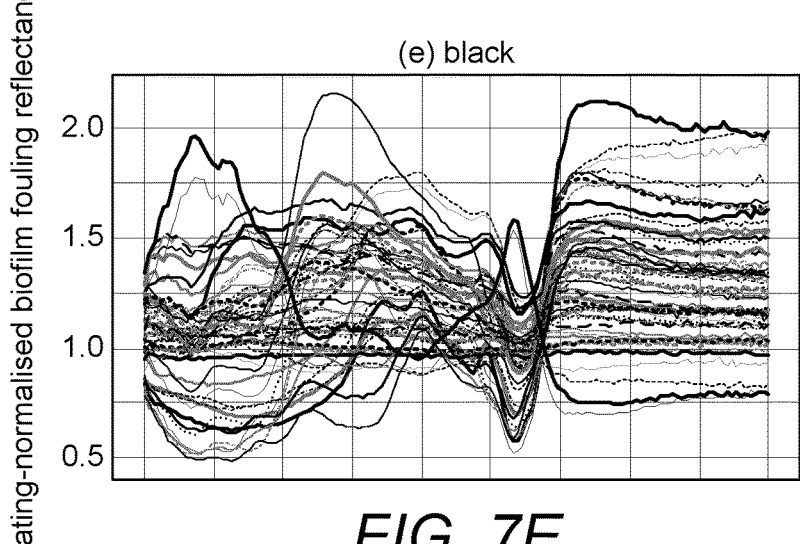
Figure 7F:
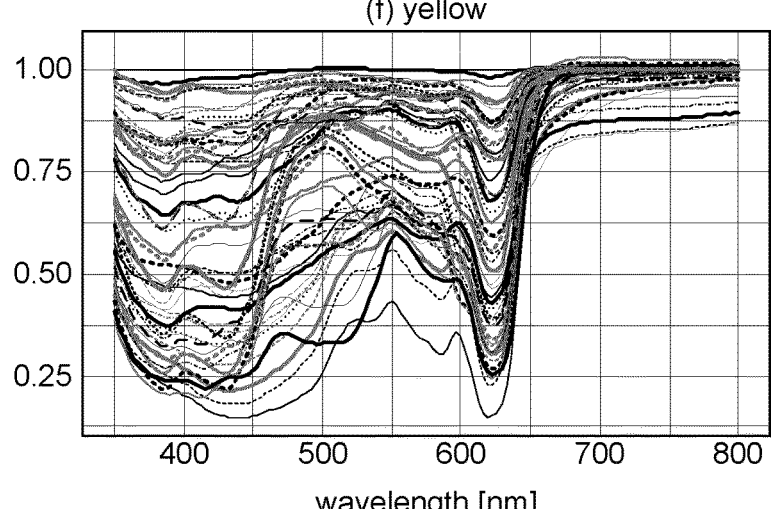

FIGS. 5A and 5B show the determined value of the spectral index rNorm and NDVI, respectively, as a function of measured chl a density in µg/cm² from coating-normalised reflectance spectra of biofilms on grey coatings. The filled circle, square, and triangle represent the diatomaceous samples (*Amphora* sp., *Achnanthes* sp., Hartlepool biofilm) and the open circles, squares and triangle represent the green algae, blue-green algae, and Singapore slime samples.

Strong alignment across the rNorm and NDVI index data for the visually highest density bright green IP mixed culture biofilms (FIGS. 5A, 5B, open triangles) and the highest density brown monoculture *Achnanthes* sp. biofilms (filled squares) underscored that the two indices truly are broad tools for quantifying microalgal biomass.

Table 2 shows power model coefficients for the calibration curves (solid lines) as shown in FIGS. 5A and 5B, calculated from the grey coating-normalised biofilm reflectance spectra, and mean absolute error of the biomass estimates from these indices as compared to extracted pigment density measurements.

TABLE 2

| Index | a | b | c | residual sum of squares | Mean absolute estimation error |
|---|---|---|---|---|---|
| rNorm | −1.921 | 0.093 | 2.477 | 0.57 | 0.422 |
| NDVI | 0.618 | 0.240 | −0.321 | 0.36 | 0.407 |

Biomass Estimation on any Colour Background
Biofilm Reflectance Spectra

The experimentally measured spectra of the biofilms, $Rbio_m$, were strongly shaped by the spectra of the underlying coatings (FIGS. 6A-6F), and the relative reflectances of the biofilms and coatings were more clearly revealed in the normalised spectra (FIGS. 7A-7F), wherein each spectrum is normalised against the spectrum of the respective coating without biofilm present.

The spectra of the background coatings (see FIG. 3) clearly structured the reflectance spectra measured from the experimental biofilms. The normalised spectra of biofilms on red, blue, and black coatings (FIGS. 7B, 7D and 7E) indicated the biofilms were brighter than the coatings (normalised reflectance >1) across colour-specific wavelength ranges. In contrast, the biofilms were all darker than the white, grey and yellow coatings (normalised reflectance <1, FIGS. 7A, 7C and 7F), and the coating-normalised spectra for biofilms on these colours were very similar.

Although the intensity varied with coating colour, the strong chl a absorbance feature around 673 nm was clearly discernible in the spectra.

The clean (i.e. no biofilm) grey, white, and black coatings had very similar flat reflectance spectra differing only slightly apart from brightness levels (FIG. 3). The spectra of the biofilms on the black coating showed differences to the spectra of the biofilms on grey or white. For the biofilms on the grey coating—the dataset which was the basis of the calibrations in this experiment—the features of the measured spectra were closely matched by the features of the normalised spectra, see FIGS. 6C and 7C. All the spectral values were approximately equal or to or less than 1 following normalisation, indicating the biofilms were darker than the clean grey coating. The same general spectral features were observable in the normalised spectra of the biofilms on white coatings as on grey. The spectra for the black coating before (FIG. 6E, mean reflectance 0-4%) and after normalisation (FIG. 7E, reflectance 0.48-2.15) indicated that the biofilm was more reflective than the black coating itself, except for those wavelengths where the microalgae had strong absorbance features (e.g. around 673 nm).

The spectral reflectance features of the biofilms on the red, blue and yellow coatings were comparable to their white, grey or black counterparts over wavelength ranges specific to each coating. The red datasets were split into dark and bright spectral ranges, below and above approximately 550 nm, respectively. In the bluer wavelengths (<550 nm), the region of the spectrum in which the red coating itself was only weakly reflective (see FIG. 3), the biofilm was brighter than the coating, and the normalised spectral values were greater than 1.0 (maximum 1.98, FIG. 7B), similar to the black dataset. In the redder wavelengths (>550 nm), the wavelength range in which the red coating was brightest, the normalised spectral values ranged from 0.18-1 and resembled the white and grey datasets. For the blue coating datasets (FIG. 7D), spectral reflectance decreased as biomass increased in the 400-500 nm wavelength range as well as in the near infrared (generally), where the blue coating was brightest and similar to the grey and white datasets. The blue coating reflected little light between 500 and 700 nm (about 5%, see FIG. 3). Over this wavelength range the biofilm was typically brighter than the coating (normalised values 1-1.25), with the exception that the chl a absorbance feature at 673 nm was still present in the normalised spectra, though shallower relative to the white and grey datasets. The yellow coating normalised spectra were similar in profile to the white and grey datasets, and had similar spectral values (0.15-1).

Figure 8:
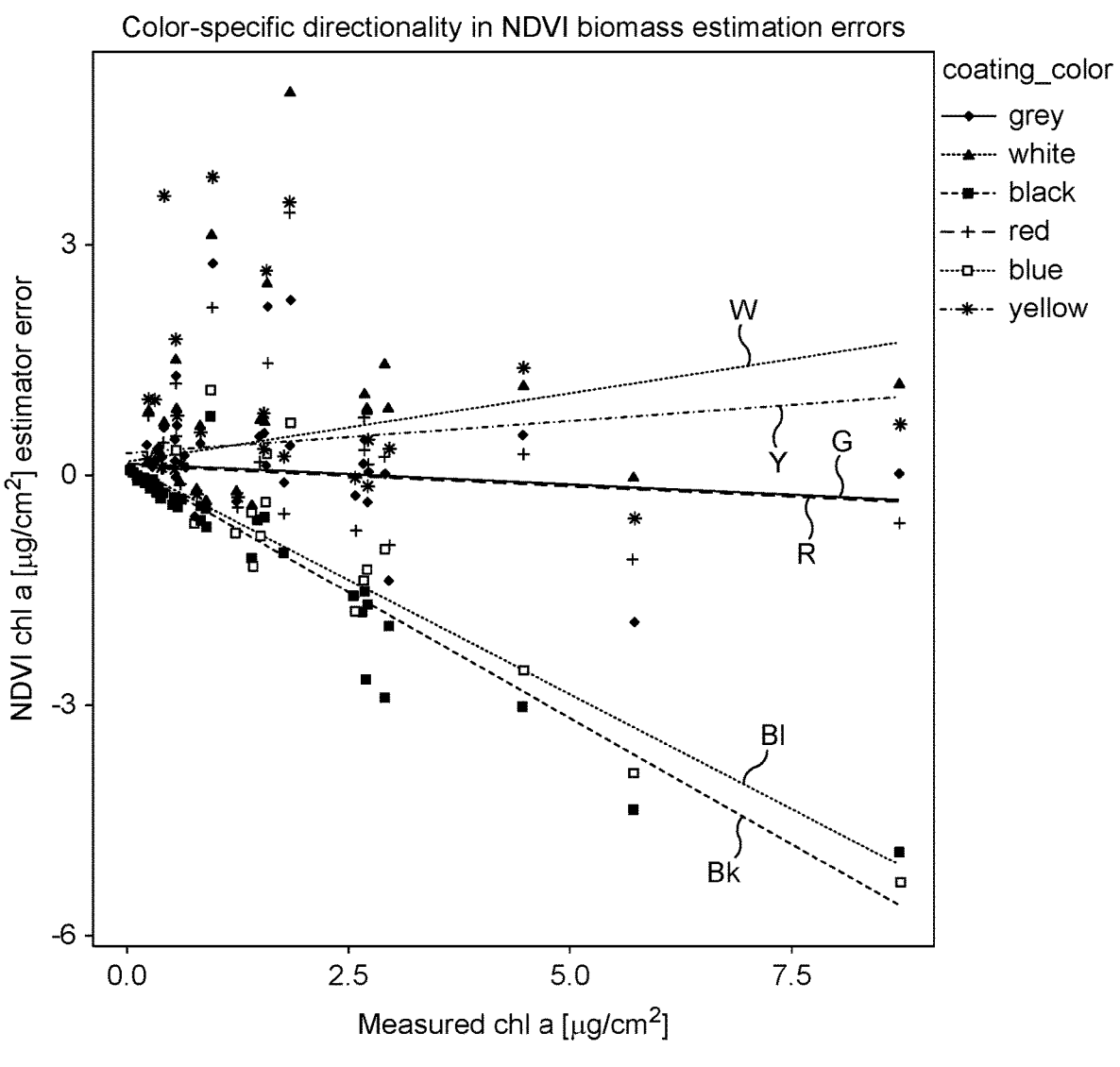
FIG. 8 shows NDVI estimation errors.

Biomass estimation errors when applying the grey calibrations to other colours:

Density-specific goodness of fit: FIG. 8 shows the biomass estimation errors (estimated minus measured µg/cm² chl a) that resulted from applying the NDVI calibration derived from the grey data to the other five colours were directional and specific to each coating color. The color-specific estimation errors were directional and linearly related to biomass. For example, the blue dataset errors (the biomass estimation errors arising from applying the index calibrations determined from biofilms on the grey coating to biofilms on blue) consistently underestimated biomass, and the underestimation error grew linearly as biomass increased ($R^2$=0.84). For the blue coating dataset, both the baseline biomass estimation error and the error factor (intercept and slope of the linear model, respectively) were significant ($p<0.05$, $p<0.001$). A similar pattern of biomass underestimation was also measured for the black coating NDVI dataset (baseline error $p<0.1$, error factor $p<0.001$, $R^2$=0.853). In contrast, white and yellow coating dataset NDVI values resulted in linearly increasing overestimates of biomass, though only the slope of the white linear model was significant ($P<0.05$).

Spectral Index Biomass Estimation Errors as a Function of the Coating Spectra

The range of marine coating colours far exceeds the six included in the experiment, and so the individual color patterns of density-specific biomass estimation errors were considered relative to the coating spectra to infer general relationships between coating colour and hyperspectral index biomass estimation errors. The baseline estimation errors, BE, and error factors, EF, for each colour were compared to the minimum reflectance of the coatings at the wavelengths incorporated in each index (e.g. 673 or 800 nm for NDVI). Non-linear relationships between coating spectral properties and estimation error are apparent.

Figure 9A:
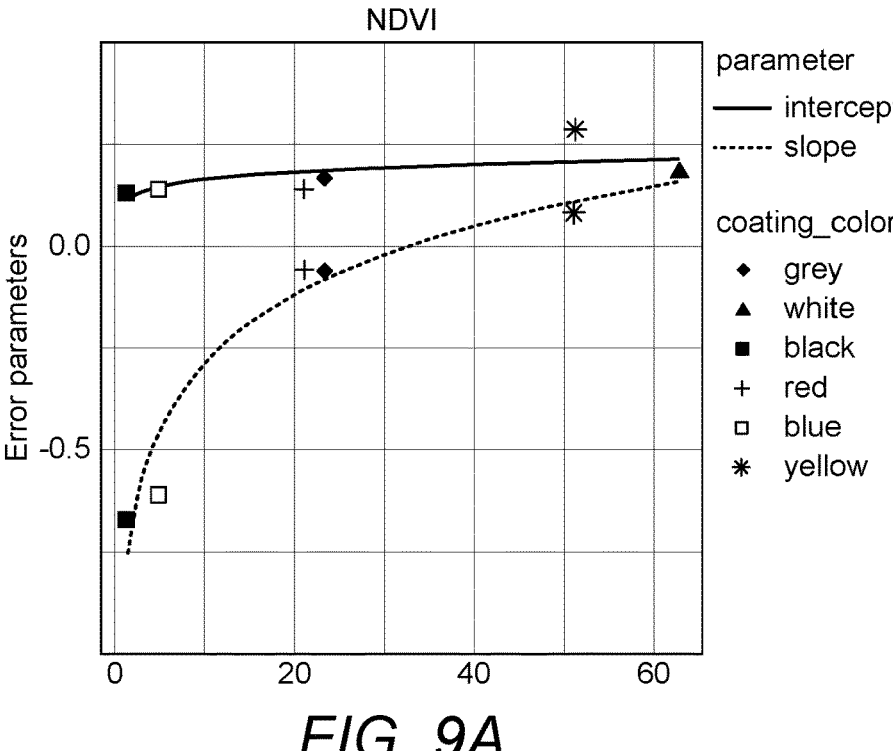
FIGS. 9A and 9B show estimation of error factors and baseline errors.
Figure 9B:
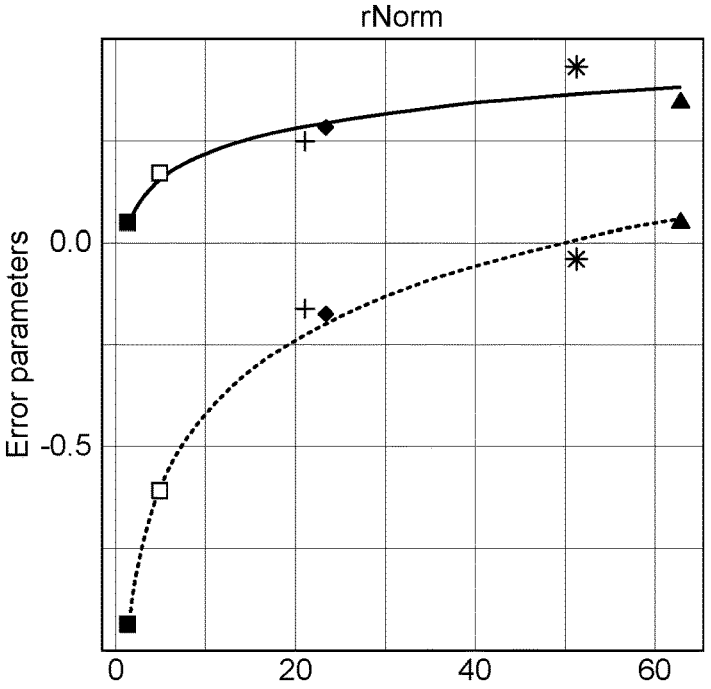

FIGS. 9A and 9B show estimation of error factors, EF, and baseline errors, BE, for rNorm, and NDVI, respectively, plotted against minimum of coating reflectance at the wavelengths incorporated in the index (673 nm for both).

Table 3 shows the models for estimating the error factors, EF, and baseline errors, BE, as determined from FIGS. 9A and 9B.

TABLE 3

| Index | BE | EF |
|---|---|---|
| rNorm | $0.0862 \ln(R_{673}) + 0.0164$ | $0.26 \ln(R_{673}) - 1.00$ |
| NDVI | $0.025 \ln(R_{673/800}) + 0.1025$ | $0.24 \ln(R_{673/800}) - 0.83$ |

Baseline error and error factors for rNorm and NDVI biomass estimates across the six coating datasets varied with the log of coating minimum reflectance (see FIG. 9A, 9B). The error factor relationship parameters were very similar for the two indices (for rNorm, NDVI respectively: $R^2=0.99$, 0.95, coefficient=0.26, 0.24). The rNorm baseline errors followed a logarithmic increase with coating minimum reflectance (FIG. 9A, $R^2=0.91$, coef=0.086). The NDVI errors were less prominently logarithmic (FIG. 9B, $R^2=0.43$, coef=0.025), and could, if desired, be described by a linear model.

Figure 10:
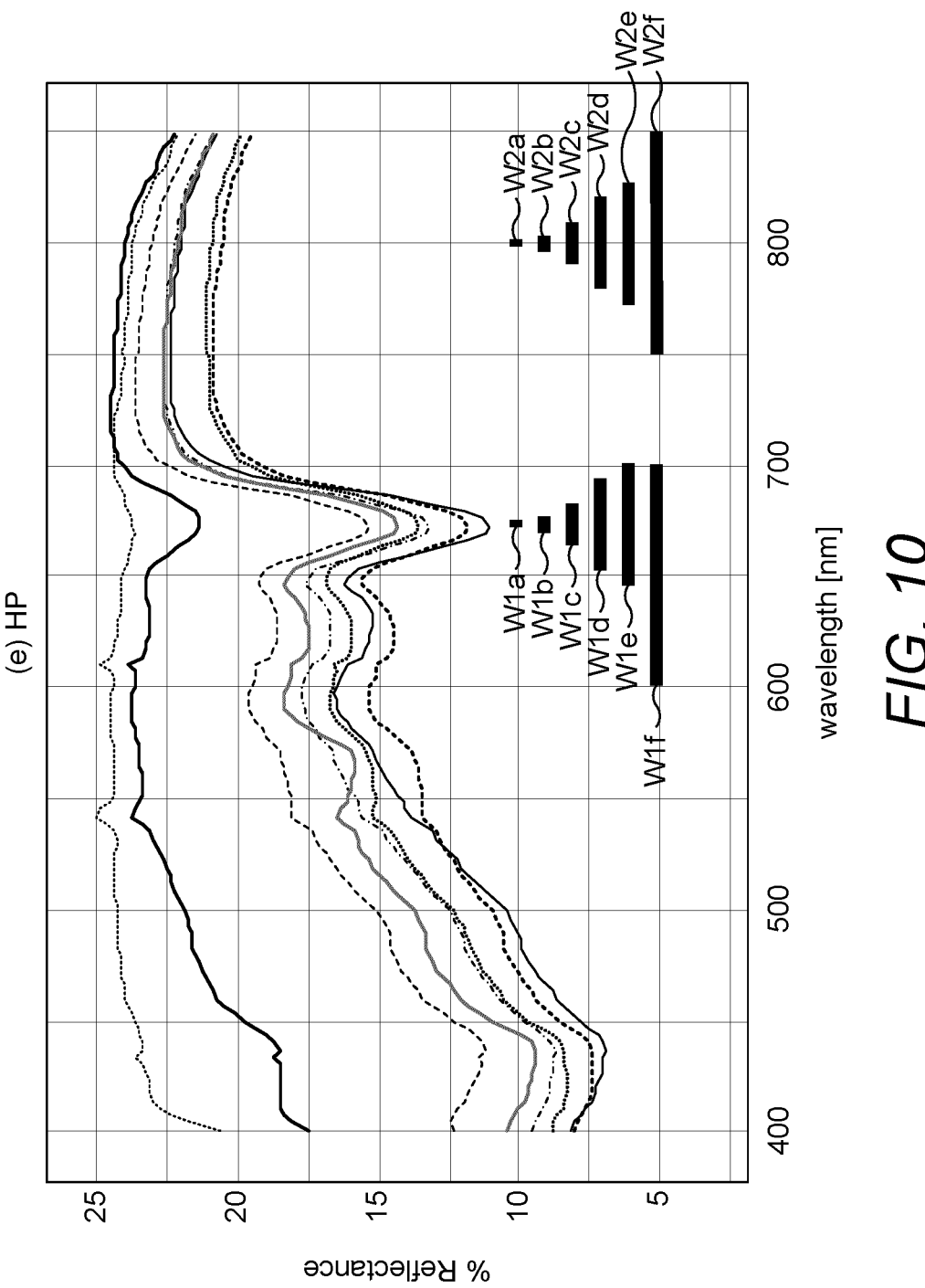
FIG. 10 shows spectral band widths.

FIG. 10 shows an example of possible different spectral ranges for use for the digital images, in this example relative to reflectance spectra of Hartlepool (HP) biofilms on a grey substrate (cf, FIG. 4, panel (e)). In this example a first spectral range is chosen around 673 nm, e.g. centered around 673 nm. A second spectral range in this example is chosen around 800 nm, e.g. centered around 800 nm. In FIG. 10 w1a denotes a first spectral range of 3.3 nm FWHM and w2a denotes a second spectral range of 3.3 nm FWHM. In FIG. 10 w1b denotes a first spectral range of 9.9 nm FWHM and w2b denotes a second spectral range of 9.9 nm FWHM. In FIG. 10 w1c denotes a first spectral range of 16.5 nm FWHM and w2c denotes a second spectral range of 16.5 nm FWHM. In FIG. 10 w1d denotes a first spectral range of 29.7 nm FWHM and w2d denotes a second spectral range of 29.7 nm FWHM. In FIG. 10 w1e denotes a first spectral range of 62.7 nm FWHM and w2e denotes a second spectral range of 62.7 nm FWHM. In FIG. 10 w1f denotes a first spectral range of 100 nm FWHM and w2f denotes a second spectral range of 100 nm FWHM. In this example the spectral band w1f is not centered around 673 nm. It will be appreciated that the spectral band w1f approximately corresponds to a red channel spectral, R, sensitivity of commercially available digital cameras. The spectral band w2f approximately corresponds to an infrared channel, IR, spectral sensitivity attainable by modified commercially available digital cameras (e.g. after removal of IR-cut filter).

Figure 11A:
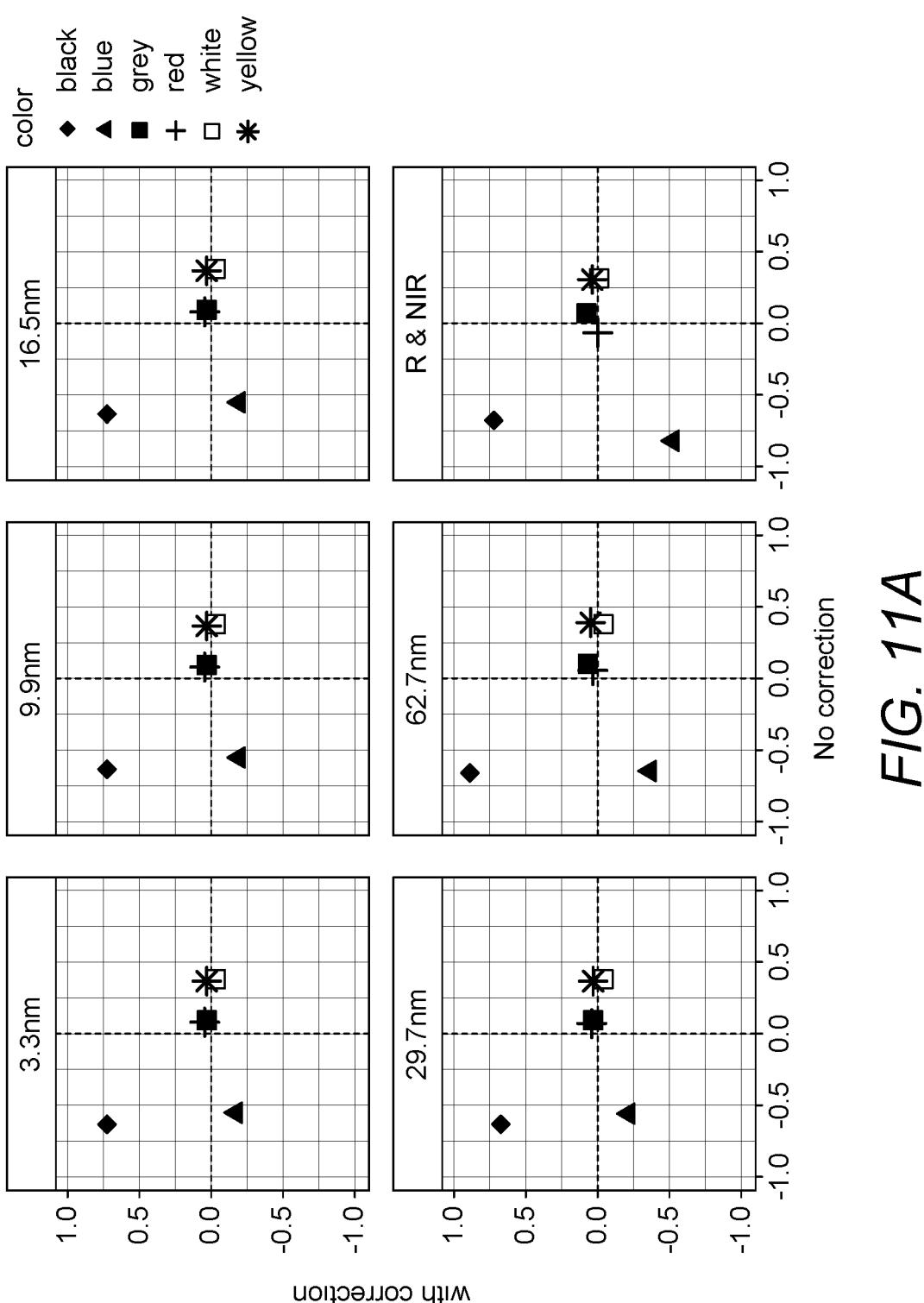
FIGS. 11A and 11B show estimation errors.
Figure 11B:
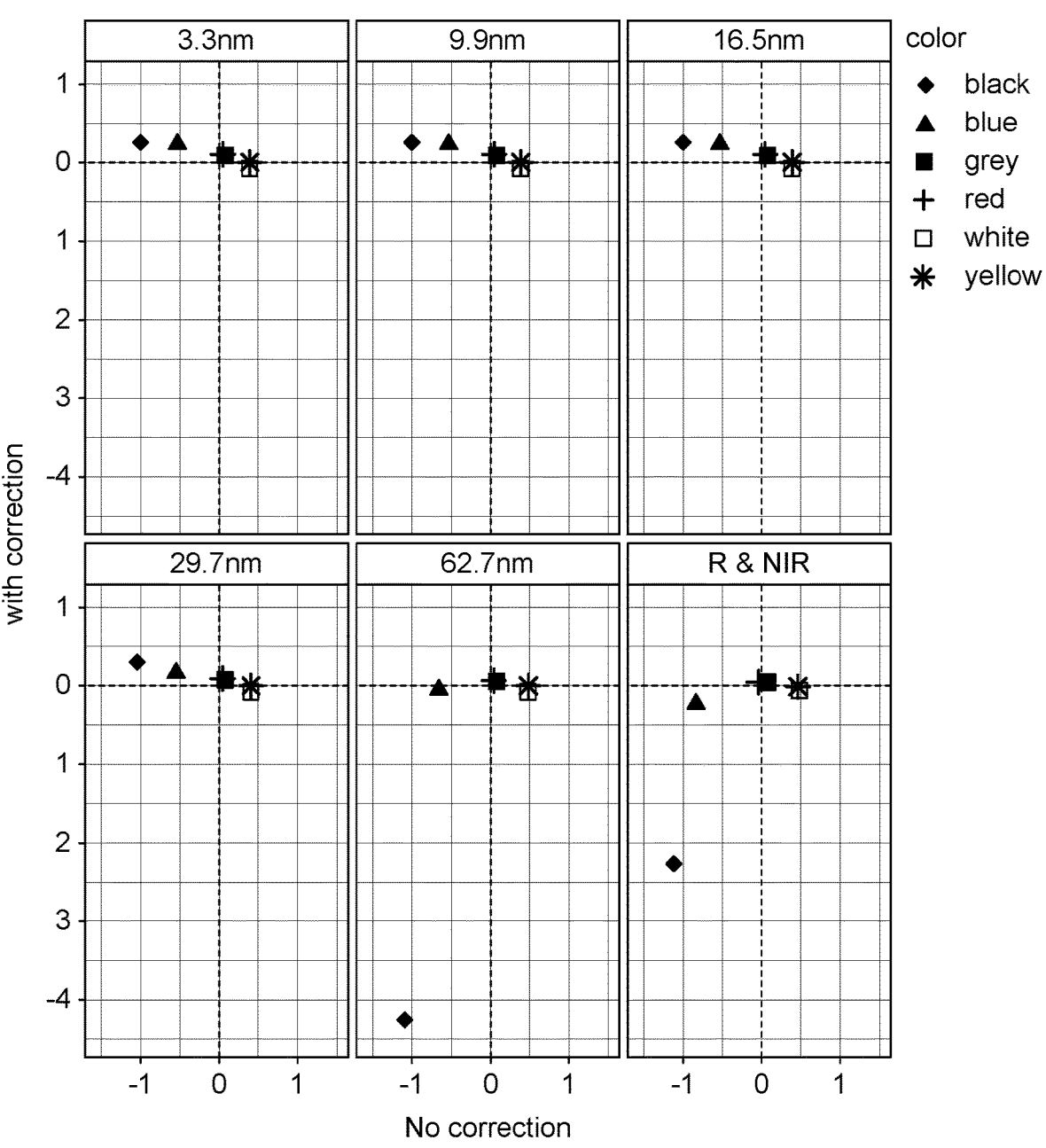

FIGS. 11A and 11B show biomass estimation errors (in μg/cm²) as a function of bandwidth of the spectral band used. FIG. 11A relates to NDVI. FIG. 11B relates to rNorm. Each panel indicates the respective spectral band width in nm. In each panel the vertical axis denotes the mean estimation error (for each of the six colors) after applying the compensation associated with the difference of the reflectance of the coating of the object relative to the reference coating. In each panel the horizontal axis denotes the mean estimation error (for each of the six colors) without applying the compensation associated with the difference of the reflectance of the coating of the object relative to the reference coating. Thus, when an indicated point lies closer to the horizontal axis than it lies to the vertical axis, the compensation associated with the difference of the reflectance of the coating of the object relative to the reference coating reduced the biomass estimation error. As can be seen from FIG. 11A, for NDVI, the compensation associated with the difference of the reflectance of the coating of the object relative to the reference coating reduced the biomass estimation error for all colors, except for black. As can be seen from FIG. 11B, rNorm, the compensation associated with the difference of the reflectance of the coating of the object relative to the reference coating reduced the biomass estimation error for all colors except for black at the larger band width values.

Although the method can be applied in respect of any color of the current coating of the object, they are sometimes less accurate where the coating is black. Therefore, the method can be applied with improved accuracy where the current coating of the object is not black, for instance where it has a reflectance of at least 5% for at least one wavelength, and preferably more than one wavelength, in the range 500 to 700 nm, such as at the wavelength(s) or in the spectral band(s) used in determining the spectral index.

Results for black coatings may be improved by increasing the number of data points used to calculate the Error Factor, $EF_{current}$, and Baseline Error, $BE_{current}$, for rNorm and NDVI.

From the above, it follows that the biomass estimation calculated from the reference Spectral Index calibration, $biomass_{SI}$, can be adjusted by the Error Factor, $EF_{current}$, and Baseline Error, $BE_{current}$, both of which are functions of the reflectance spectrum of the current coating upon which the biomass is present. Then the estimated biomass on the current coating, $biomass_{current}$, can be determined from the equation $$biomass_{current} = biomass_{SI} * \left(1 - \left(\frac{EF_{current}}{1 + EF_{current}}\right)\right) - BE_{current},$$

And using the error factor, EF, and baseline error, BE, e.g. as found in table 3.

This can be combined with the equation for determining the pigment surface area density from the spectral index and using the and the calibration values a, b and c, e.g. as found in table 2

$$pigment\ surface\ area\ density = \left(\frac{SI - c}{a}\right)^{\frac{1}{b}}.$$

The two equations can be combined into the equation $$biomass_{current} = \left(\frac{SI - c}{a}\right)^{\frac{1}{b}} \cdot \left(1 - \left(\frac{EF_{current}}{1 + EF_{current}}\right)\right) - BE_{current}.$$

Hence, it is possible to estimate the aquatic environment-originating biofilm biomass on a coating on an object, e.g. that is immersed permanently or intermittently in an aquatic environment, on the basis of the spectral index, SI, and one or more calibration values while compensating the calculated biomass pigment surface area density for the reflectance of the coating of the object by applying a compensation associated with the reflectance of the coating of the object. Thus, biofilm biomass can be estimated on any color object, such as a vessel, using the presented equations and calibrated values.

It will be appreciated that herein the grey coating, having a reflectance of 24% was chosen as the reference point for determining the calibration values a, b and c for estimating the biomass pigment surface area density on the basis of the spectral indices, but that another reference coating, e.g. having a different reflectance could have been chosen, which would have changed the numerical values of the calibration values a, b and c. This, however, does not affect the inventive concept behind the present method.

It will also be appreciated that herein the grey coating, having a reflectance of 24% was chosen as the reference point for determining the error factor, EF, and baseline error, BE, for correcting for different color coatings underneath the microfouling layer, but that another reference coating, e.g. having a different reflectance could have been chosen, which would have changed the numerical values of the error factor, EF, and baseline error, BE. However, this also does not affect the inventive concept behind the present method.

Using the present method, regardless of the color of the coating underneath a biofilm layer, a spectral index can be determined from one or more digital images, on the basis of which a biomass pigment surface area density can be estimated as if the coating color corresponded to the reference coating color used in determining the calibration values, and the thus estimated biomass pigment surface area density can be compensated for reflectance of the current coating of the object by applying the compensation associated with the reflectance of the coating of the object, relative to the reference coating color as described above.

The present method allows for obtaining one or more digital images of a fouled portion of the coating of the object, such as under water, e.g. using an (unmanned) submarine vessel. The one or more images can include images at different spectral ranges, such as spectral ranges, e.g. having a FWHM of 100 nm or less, such as 50 nm or less, such as 20 nm or less, such as 3 nm or less. The one or more images can be obtained using a hyperspectral camera. It is also possible to obtain the one or more images using a general purpose digital camera.

Diver and remotely operated vehicle, ROV, inspections of ships can use commercial underwater cameras and lighting rigs. The cameras can be adapted with band pass filters specifically tuned to the chl a red light absorption feature at 673 nm. If paired with suitable calibration and imaging protocols, it is possible to incorporate rNorm biomass estimation into underwater inspection. NDVI imaging at a depth of about 2 m or more below the water line. In embodiments, NIR reflectance from a surface can be measured, optionally using equipment such as IR lamp assemblies and an IR-sensitive imaging system.

Herein, the invention is described with reference to specific examples of embodiments of the invention, which should not be considered limiting on the scope of the invention claimed. For the purpose of clarity and conciseness, features are described herein as part of the same or separate embodiments, however, alternative embodiments having combinations of all or some of the features described in these separate embodiments are also envisaged.

In the examples, a hyperspectral camera is used. It will be clear that it is also possible to use a broadband digital camera in combination with one or more bandpass filters. It is also possible to use a broadband digital camera in combination spectral band illumination. It is also possible to use a broadband digital camera, e.g. using a red channel and optionally an infrared channel. The red channel can be approximately from 600 to 700 nm. The infrared channel can be approximately from 750 to 850 nm.

However, other modifications, variations, and alternatives are also possible. The specifications, drawings and examples are, accordingly, to be regarded in an illustrative sense rather than in a restrictive sense.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

The invention claimed is:

1. A method for estimating aquatic environment-originating biofilm biomass on a coating of an object, including:
    a) obtaining one or more digital images of a fouled portion of the coating on the object using a digital camera or imager,
    b) determining from each of the one or more images a respective reflectance value for the portion of the coating;
    c) determining on the basis of the one or more reflectance values a value of a spectral index representative of biomass;
    d) calculating a biomass pigment surface area density on the basis of the spectral index, SI, and one or more calibration values determined for a reference coating; and
    e) compensating the calculated biomass pigment surface area density for the reflectance of the coating of the object by applying a compensation associated with the difference of the reflectance of the coating of the object relative to the reference coating thereby generating a compensated biomass pigment surface area density;
    f) producing a map of biofilm biomass on the fouled portion of the coating of the object from the compensated biomass pigment surface area density.

2. The method of claim 1, wherein the compensation is based on a comparison reflectance value representative for the coating underlying the biofilm biomass.

3. The method of claim 2, wherein the comparison reflectance value is:
    a reflectance value determined for a part of the coating of the object from which all biomass had been removed;
    a reflectance value determined from a reference object; or
    a reflectance value stored in a database.

4. The method of claim 1, wherein each of the one or more images is obtained in a spectral band.

5. The method of claim 4, wherein the compensation is based on a comparison reflectance value representative for the coating underlying the biofilm biomass, the comparison reflectance value being a minimum value of the reflectance value for the coating underlying the biofilm biomass in the one or more spectral bands.

6. The method of claim 4, wherein at least one of the spectral bands is chosen to encompass an absorption wavelength of chlorophyll, or at least one of the spectral bands is chosen to exclude an absorption wavelength of chlorophyll.

7. The method of claim 4, wherein at least one of the spectral bands is chosen around 433, 460, 496, 555, 584, 601, 673, or 800 nm.

8. The method of claim 1, wherein in step e) the estimated biomass pigment surface area density on the coating, $biomass_{current}$, can be determined from the biomass calculated from the Spectral Index, biomass$_{SI}$, determined in step d) by an Error Factor, EF$_{current}$, and Baseline Error BE$_{current}$, from the equation $$\text{biomass}_{current} = \text{biomass}_{SI} * \left(1 - \left(\frac{EF_{current}}{1+EF_{current}}\right)\right) - BE_{current}.$$

9. The method of claim 8, wherein the spectral index, SI, is one of:
coating normalized red reflectance defined as $$SI = rNorm673 = \frac{R673}{R673_{clean}};$$

Normalized Difference Vegetation Index defined as $$SI = NDVI = \frac{R800 + R673}{R800 - R673};$$

wherein R673 is the determined reflectance value in the range of 605-740 nm; R800 is the determined reflectance value in the range of 720-900 nm; R673$_{clean}$ is the reflectance value in the range of 605-740 nm at the coating of the object without biomass.
10. The method of claim 9, wherein
if the spectral index is the coating normalized red reflectance, EF$_{current}$=0.26 ln(R$_{current673}$)−1.00; BE$_{current}$=0.0862 ln(R$_{current673}$)+0.0164; and
if the spectral index is the Normalized Difference Vegetation Index, EF$_{current}$=0.24 ln(R$_{current673}$)−0.83; BE$_{current}$=0.025 ln(R$_{current673}$)+0.1025;
wherein R$_{current673}$ is the reflectance value of the current coating at 673 nm.
11. The method of claim 1, wherein the spectral index includes a ratio of two reflectance values.
12. The method of claim 1, wherein the spectral index, SI, is one of:
coating normalized red reflectance defined as $$SI = rNorm673 = \frac{R673}{R673_{clean}};$$

Normalized Difference Vegetation Index defined as $$SI = NDVI = \frac{R800 + R673}{R800 - R673};$$

wherein R673 is the determined reflectance value in the range of 605-740 nm; R800 is the determined reflectance value in the range of 720-900 nm; R673 clean is the reflectance value in the range of 605-740 nm at the coating of the object without biomass.

13. The method of claim 12, wherein in step d) the pigment surface area density is determined from $$\text{pigment surface area density} = \left(\frac{SI - c}{a}\right)^{\frac{1}{b}},$$

wherein a, b and c are calibration values.
14. The method of claim 13, wherein
if the spectral index is the coating normalized red reflectance,
a=−1.921, b=0.093, c=2.477; and
if the spectral index is the Normalized Difference Vegetation Index,
a=0.618, b=0.240, c=−0.321.
15. The method of claim 1, wherein in step d) the pigment surface area density is determined from $$\text{pigment surface area density} = \left(\frac{SI - c}{a}\right)^{\frac{1}{b}},$$

wherein a, b and c are calibration values.
16. The method of claim 1, wherein the one or more digital images are obtained using a submarine.
17. The method of claim 1, wherein the camera is a hyperspectral camera and the one or more digital images are hyperspectral images.
18. A system for estimating aquatic environment-originating biofilm biomass on a coating of an object, including a digital camera or imager and a processor configured for:
obtaining one or more digital images of a fouled portion of the coating on the object;
determining from each of the one or more images a respective reflectance value for the portion of the coating;
determining on the basis of the one or more reflectance values a value of a spectral index representative of biomass;
calculating a biomass pigment surface area density on the basis of the spectral index, SI, and one or more calibration values determined for a reference coating; and
compensating the calculated biomass pigment surface area density for the reflectance of the coating of the object by applying a compensation associated with the difference of the reflectance of the coating of the object relative to the reference coating thereby generating a compensated biomass pigment surface area density;
wherein a map of biofilm biomass on the fouled portion of the coating of the object is produced from the compensated biomass pigment surface area density.
19. The system of claim 18, wherein the camera is a hyperspectral camera and the one or more digital images are hyperspectral digital images.

* * * * *